US012592115B2

(12) United States Patent　　(10) Patent No.: US 12,592,115 B2

Jain et al.　　(45) Date of Patent: Mar. 31, 2026

(54) HANDS-FREE VENDING MACHINE AND DOOR OPENING ASSEMBLY

(71) Applicant: PepsiCo, Inc., Purchase, NY (US)

(72) Inventors: Sandeep Jain, Gurgaon (IN); Gurmeet Singh Bhutani, Haryana State (IN)

(73) Assignee: PepsiCo, Inc., Purchase, NY (US)

( * ) Notice: Subject to any disclaimer, the term of this patent is extended or adjusted under 35 U.S.C. 154(b) by 718 days.

(21) Appl. No.: 17/494,412

(22) Filed: Oct. 5, 2021

(65) Prior Publication Data

US 2022/0108581 A1　　Apr. 7, 2022

(30) Foreign Application Priority Data

Oct. 6, 2020　(IN) .............................. 202041043379

(51) Int. Cl.
| | |
|---|---|
| *G07F 17/00* | (2006.01) |
| *B65G 1/08* | (2006.01) |
| *E05B 1/00* | (2006.01) |
| *F25D 23/02* | (2006.01) |
| *G06Q 20/20* | (2012.01) |

(Continued)

(52) U.S. Cl.
CPC ........... *G07F 17/0014* (2013.01); *B65G 1/08* (2013.01); *E05B 1/0069* (2013.01); *F25D 23/028* (2013.01); *G06Q 20/20* (2013.01); *G07F 7/00* (2013.01); *G07F 9/00* (2013.01)

(58) Field of Classification Search
CPC .. B65G 1/08; G06Q 20/20; G07F 7/00; G07F 17/0014; G07F 9/00; E05B 1/0069; F25D 23/028
See application file for complete search history.

(56) References Cited

U.S. PATENT DOCUMENTS

| | | | | |
|---|---|---|---|---|
| 1,993,234 A | * | 3/1935 | Wolfe ................. | G07F 17/0071 |
| | | | | 221/249 |
| 2,293,073 A | * | 8/1942 | Osborne ................. | G07F 13/10 |
| | | | | 194/297 |

(Continued)

FOREIGN PATENT DOCUMENTS

| | | |
|---|---|---|
| CN | 205210959 U | 5/2016 |
| GB | 2350863 B | 5/2001 |

(Continued)

OTHER PUBLICATIONS

International Search Report and Written Opinion in International Application No. PCT/US2021/053597, mailed Mar. 1, 2022 (12 pages).

(Continued)

*Primary Examiner* — Gene O Crawford

*Assistant Examiner* — Kelvin L Randall, Jr.

(74) *Attorney, Agent, or Firm* — Sterne, Kessler, Goldstein & Fox P.L.L.C.

(57) ABSTRACT

A pedal-operated vending machine includes a housing defining a product storage area and a delivery portal. The vending machine further includes a dispensing mechanism configured to convey a product in the product storage area to the delivery portal. Vending machine may further include a pedal arranged on a lower end of the housing and configured to be operated by a foot of a consumer to actuate the dispensing mechanism to move the product from the product storage area to the delivery portal.

14 Claims, 16 Drawing Sheets

(51) Int. Cl.
  *G07F 7/00*          (2006.01)
  *G07F 9/00*          (2006.01)

(56)              References Cited

U.S. PATENT DOCUMENTS

| | | | | |
|---|---|---|---|---|
| 2,307,589 | A * | 1/1943 | Johnson | G07F 13/065 |
| | | | | 221/96 |
| 2,512,961 | A | 6/1950 | Morrison | |
| 3,012,837 | A * | 12/1961 | Morrissey, Jr. | E05B 17/0033 |
| | | | | 49/276 |
| 3,251,447 | A * | 5/1966 | Brown | G07F 9/04 |
| | | | | 194/215 |
| 3,341,066 | A * | 9/1967 | Bowes | A61B 17/06133 |
| | | | | 221/72 |
| 3,364,621 | A * | 1/1968 | Erickson | D06F 37/28 |
| | | | | 312/319.9 |
| 3,380,629 | A * | 4/1968 | Kontra | B67D 1/1466 |
| | | | | 222/26 |
| 3,435,699 | A * | 4/1969 | D'Andrea | G07F 17/34 |
| | | | | 74/481 |
| 3,570,711 | A * | 3/1971 | Young, Jr. | B65B 43/205 |
| | | | | 221/295 |
| 3,610,464 | A * | 10/1971 | Loughry | B65B 57/20 |
| | | | | 221/13 |
| 3,830,407 | A | 8/1974 | Wierlo | |
| 4,108,333 | A * | 8/1978 | Falk | G07F 9/105 |
| | | | | 221/13 |
| 4,252,250 | A * | 2/1981 | Toth | G07F 11/58 |
| | | | | 221/13 |
| 5,417,261 | A * | 5/1995 | Kanzler | B65B 39/002 |
| | | | | 141/10 |
| 5,816,918 | A | 10/1998 | Kelley et al. | |
| 6,098,917 | A * | 8/2000 | Cruz | A47K 10/3836 |
| | | | | 242/590 |
| 6,328,180 | B1 * | 12/2001 | Sorensen | G07F 11/42 |
| | | | | 221/241 |
| 7,270,352 | B1 | 9/2007 | Stuart | |
| 9,376,277 | B2 * | 6/2016 | Ayash | B65H 1/266 |
| 9,394,640 | B2 * | 7/2016 | Bentley | D05B 11/00 |
| 2002/0117509 | A1 * | 8/2002 | Whitten | G06Q 20/20 |
| | | | | 221/9 |
| 2003/0033669 | A1 * | 2/2003 | Fernie | A47K 10/48 |
| | | | | 4/619 |
| 2004/0059465 | A1 * | 3/2004 | Nickerson | G07F 9/026 |
| | | | | 700/236 |
| 2004/0082454 | A1 * | 4/2004 | White | B65B 57/04 |
| | | | | 493/189 |
| 2004/0133466 | A1 * | 7/2004 | Redmond | G06Q 30/0268 |
| | | | | 705/14.38 |
| 2005/0173462 | A1 | 8/2005 | Stumler et al. | |
| 2010/0275267 | A1 * | 10/2010 | Walker | G06T 3/20 |
| | | | | 709/206 |
| 2011/0245969 | A1 * | 10/2011 | Monto | G07F 17/0092 |
| | | | | 700/240 |
| 2011/0307098 | A1 * | 12/2011 | Ennis | F25D 23/028 |
| | | | | 704/E11.001 |
| 2013/0221018 | A1 * | 8/2013 | Garson | G07F 11/36 |
| | | | | 221/1 |
| 2015/0356563 | A1 * | 12/2015 | Vohra | G06Q 20/20 |
| | | | | 705/44 |
| 2017/0335268 | A1 * | 11/2017 | Maggiore | B33Y 10/00 |

FOREIGN PATENT DOCUMENTS

| | | | |
|---|---|---|---|
| JP | S5847982 | U | 3/1983 |
| JP | 2013117845 | A | 6/2013 |
| JP | 2014061471 | A | 4/2014 |

OTHER PUBLICATIONS

Extended European Search Report in counterpart European Application No. 21878374.4, issued Apr. 12, 2024 (8 pages).

* cited by examiner

HANDS-FREE VENDING MACHINE AND DOOR OPENING ASSEMBLY

FIELD

Embodiments described herein generally relate to hands-free vending machines and coolers. Specifically, embodiments described herein relate to pedal-operated vending machines that allow one or more steps of a vending operation to be performed by actuation of a pedal.

BACKGROUND

Product storage cabinets, such as coolers, may be used to store and display products available for purchase. Generally, product storage cabinets include a product storage area that can be accessed by opening a door of the cabinet. A consumer may access the stored products by grasping a handle of the door with one hand and pulling the handle to open the door and access the products. The consumer may hold the door open and manually retrieve products from the product storage area and close the door after retrieving the desired products.

Similarly, consumers generally use their hands to operate vending machines. The consumer may enter payment via a payment unit, such as by inserting paper money or coins into a slot, or by swiping or inserting a payment card in a card reader. The consumer may then enter a user input of a product selection, such as by pressing keys on a keypad or touching a touchscreen display. The selected product may then be dispensed to a delivery portal, and the consumer may open a door or flap on the delivery portal to retrieve the dispensed product.

BRIEF SUMMARY OF THE INVENTION

Some embodiments described herein relate to a pedal-operated vending machine that includes a housing defining a product storage area and a delivery portal, a dispensing mechanism configured to convey a product in the product storage area to the delivery portal, and a pedal arranged on a lower end of the housing that is configured to be operated by a foot of a consumer to actuate the dispensing mechanism to move the product from the product storage area to the delivery portal.

In any of the various embodiments described herein, the pedal may be connected to the dispensing mechanism via a mechanical linkage such that operating the pedal actuates the dispensing mechanism.

In any of the various embodiments described herein, the vending machine may further include a control unit in communication with the dispensing mechanism and the pedal, wherein the control unit is configured to actuate the dispensing mechanism when the pedal is operated.

In any of the various embodiments described herein, the vending machine may further include a second pedal configured to be operated by a foot of a consumer to actuate a second dispensing mechanism to move a second product from the product storage area to the delivery portal.

In any of the various embodiments described herein, the vending machine may further include a payment processing unit configured to receive a payment from a consumer. In some embodiments, a control unit may be communication with the payment processing unit and the pedal, such that the control unit enables actuation of the pedal when a payment is received as determined by the payment processing unit.

In any of the various embodiments described herein, the vending machine may further include a door movable from a closed position in which the door covers the delivery portal to an open position in which the door uncovers the delivery portal for access by a consumer when the pedal is operated.

In any of the various embodiments described herein, the vending machine may be configured to dispense a product without a hand of a consumer contacting the vending machine.

In any of the various embodiments described herein, the pedal may be arranged within a recessed area on the lower end of the housing.

Some embodiments described herein relate to a pedal-operated vending machine that includes a housing defining a product storage area and a delivery portal, a dispensing mechanism configured to convey a product from the product storage area to the delivery portal, a door movably covering the delivery portal, wherein the door is movable from a closed position to an open position, and a pedal arranged on a lower end of the housing below the delivery portal, wherein the pedal is configured to be operated by a foot of a consumer to move the door from the closed position to the open position to allow a consumer to retrieve a product in the delivery portal without contacting the door.

In any of the various embodiments described herein, the door may be connected to the housing by a hinge.

In any of the various embodiments described herein, the door may have a curvature, and the door may rotate about a vertical axis to move from the closed position to the open position.

In any of the various embodiments described herein, the pedal may be connected to the door via a mechanical linkage.

In any of the various embodiments described herein, the vending machine may further include a motor configured to move the door from the closed position to the open position. In some embodiments, the vending machine may further include a control unit in communication with the motor and the pedal, wherein the control unit may be configured to actuate the motor when the pedal is operated.

Some embodiments described herein relate to a hands-free door opening assembly that includes a mounting plate configured to be secured to a lower end of a door opposite a side of the door having a hinge, and a body connected to the mounting plate and configured to be engaged by a foot of a consumer to open the door, wherein the body comprises a first portion connected to and extending perpendicularly from the mounting plate, a second portion connected to and extending perpendicularly from the first portion, and a flange extending upwardly from the second portion.

In any of the various embodiments described herein, the door opening assembly may further include a surface engaging member configured to move along the ground as the door is opened. In some embodiments, the surface engaging member may include a wheel mounted on the second portion of the body.

In any of the various embodiments described herein, the body may further include a rib on the body configured to provide structural support to the body.

In any of the various embodiments described herein, the mounting plate and the body may be integrally formed.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
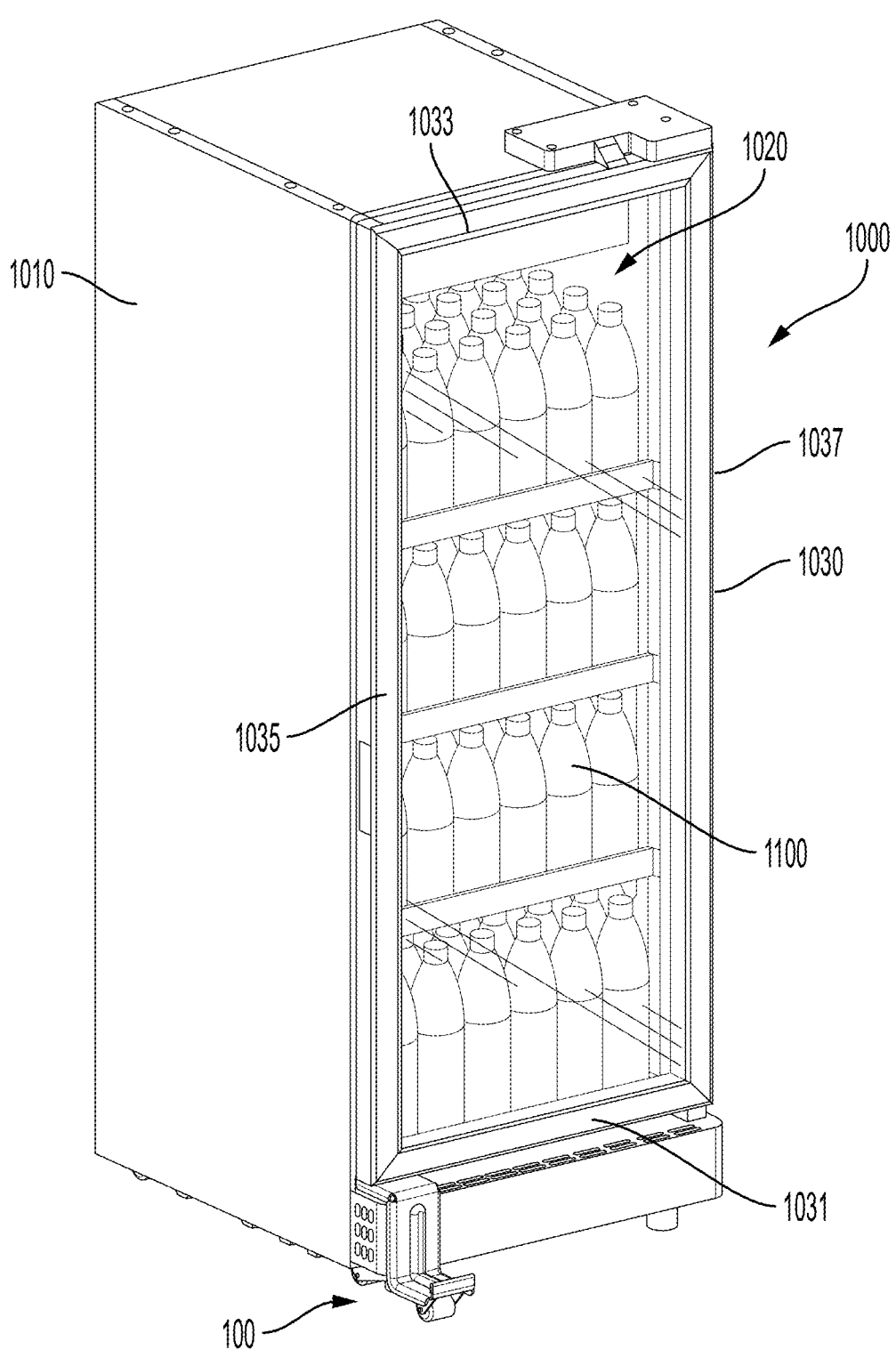
FIG. 1 shows a perspective view of a door opening assembly installed on a product storage cabinet according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Product storage cabinets are ubiquitous and may be found in any of various locations, such as grocery stores, convenience stores, superstores, gas stations, movie theaters, schools, offices, sporting or concert venues, and rest stops, among other locations. In order to retrieve a product from a product storage cabinet, a consumer must generally use their hand to grasp a door of the cabinet, or a handle on the door, and manually open the door to access the products within the cabinet. Over time, many individuals may grasp the door or handle which may result in spread of germs, such as bacteria and viruses. If the consumer touches the door or handle of the cabinet and then touches his or her face, the consumer may be at an increased risk to contract an illness. While the door or handle may be periodically cleaned, frequent cleaning of the door or handle may be cumbersome or impractical, particularly in a stores, such as grocery stores, that may have dozens of product storage cabinets and that may serve hundreds of customers per day.

However, consumers may be unable to avoid going to a grocery store, superstore, convenience store or the like to buy groceries and other essential products, and consumers may be unable to open a door of a product storage cabinet to retrieve products for purchase without the use of their hands. As a result, there is a need in the art for door opening assemblies that allow doors to be opened in a hands-free manner to prevent the spread of germs. Further, a hands-free door opening assembly that may be quickly and easily retrofitted onto an existing product storage cabinet would provide a rapid and low cost solution that allows for continued use of existing storage cabinets while helping to protect consumers from the spread of germs. Thus, there is a need in the art for a hands-free door opening assembly that may be retrofitted onto an existing product storage cabinet.

Similarly, vending machines often require consumers to perform one or more steps of the vending process using their hands. For example, a consumer may have to operate a user interface with their fingers, such as a keypad or touch screen to enter payment and select a product. The consumer may also have to touch a door or flap covering a delivery portal to access the dispensed product. As a result, each consumer must touch various surfaces of the vending machine resulting in exposure to germs and presenting a risk of illness. Therefore, there is a need for a vending machine that allows one or more steps of the vending operation to be carried out in a hands-free manner.

Some embodiments described herein relate to a pedal-operated vending machine that allows a consumer to operate a pedal with his or her foot to perform one or more steps of a vending operation, such as dispensing the product or opening a door of a delivery portal. In this way, the consumer may avoid contacting the vending machine with his or her hands to reduce the spread of germs. Some embodiments described herein relate to a door opening assembly for a door of a product storage cabinet that can be operated by a body part of the consumer other than the consumer's hands. In this way, the consumer may more easily open a door of a product storage cabinet without the use of their hands to reduce the spread of germs. Some embodiments described herein relate to a door opening assembly that may be retrofitted onto the door of an existing product storage cabinet so as to avoid the time and expense in replacing the entire door or the entire product storage cabinet.

As used herein, the term "hands-free" may refer to the ability to perform a task, such as open a door, without requiring the use of a consumer's hands.

As used herein, the term "body part" may refer to any body part other than a hand, including but not limited to a wrist, forearm, elbow, upper arm, calf, knee (or back of the knee), thigh, foot, heel, or ankle.

A door opening assembly 100 configured to allow a consumer to open a door in a hands-free manner is shown in FIG. 1. Door opening assembly 100 may be particularly suited for use with a door 1030 of a product storage cabinet 1000, but may be used on any door. Product storage cabinet 1000 may be used to store any of various products, for example packaged beverages, such as canned or bottled beverages, or snack or food items, among others. While the present application will describe door opening assembly 100 primarily as used with product storage cabinet 1000, it is understood that door opening assembly 100 may be used with various types of product storage cabinets, such as a product storage cabinet having one or more doors, product storage cabinets having an opaque or transparent portions, and refrigerated or non-refrigerated product storage cabinets, among others.

An exemplary product storage cabinet 1000 for storing products 1100 is shown in FIG. 1. Cabinet 1000 may include a housing 1010 that defines a product storage area 1020, and a door 1030 movably secured to housing 1010 to selectively allow access to product storage area 1020 and products 1100. In some embodiments, product storage cabinet 1000 may be configured to store products 1100 at ambient or room temperature. Cabinet 1000 may be thermally insulated to maintain product storage area 1020 at a predetermined temperature. Further, in some embodiments, product storage cabinet 1000 may be a cooler and may include a cooling unit for maintaining product storage area 1020 at a predetermined temperature, such as for storing products 1100 that need to be cooled or chilled, e.g., beverages, or for storing perishable food items. The cooling unit may be a vapor-compression refrigeration system, a thermoelectric cooling unit, or a cold plate, among others.

Door opening assembly 100 may be secured to door 1030 of cabinet 1000 to allow a consumer to open a door without the use of the consumer's hands. While door opening assembly 100 may be retrofitted onto door 1030, in some embodiments, door 1030 may be integrally formed with door opening assembly 100. Thus, product storage cabinet 1000 may be originally manufactured to include the door opening assembly 100 integrally formed with door 1030, or an original door of product storage cabinet 1000 may be replaced with a door having an integrally formed door opening assembly.

Door 1030 may include a lower end 1031 opposite an upper end 1033, and a hinge side 1037 at which a hinge rotatably secures door 1030 to housing 1010 opposite a free side 1035. Door opening assembly 100 may be secured to free side 1035 of door 1030 to facilitate opening door 1030 in a hands-free manner. In some embodiments, door opening assembly 100 may be secured to lower end 1031 of door 1030 so that door opening assembly 100 is operable via a foot of a consumer.

Figure 2:
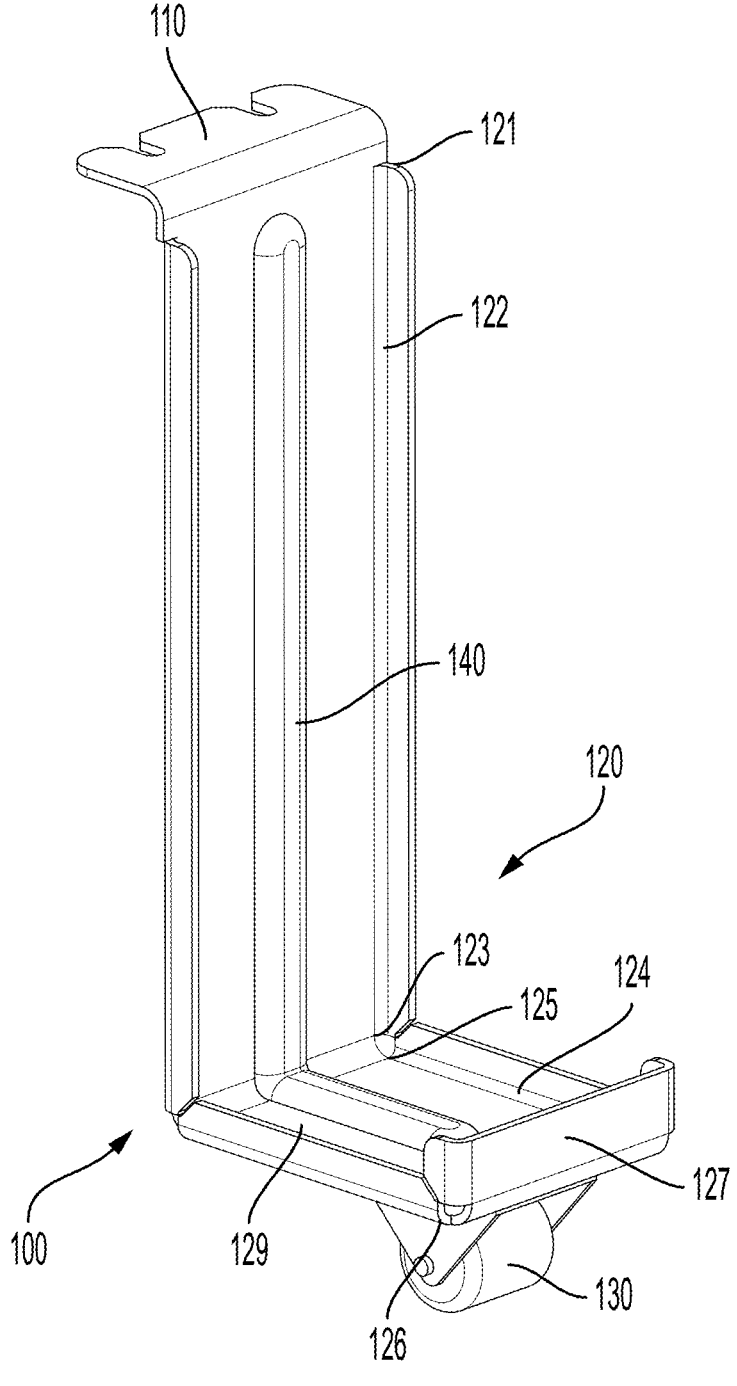
FIG. 2 shows a perspective view of the door opening assembly of FIG. 1.

In some embodiments, door opening assembly 100 may including a mounting plate 110 and a body 120, as shown in FIG. 2. Mounting plate 110 may be configured to secure door opening assembly 100 to door 1030, and body 120 may be configured to be engaged by a body part of a consumer to facilitate opening door 1030 to access products in product storage area 1020.

Figure 3:
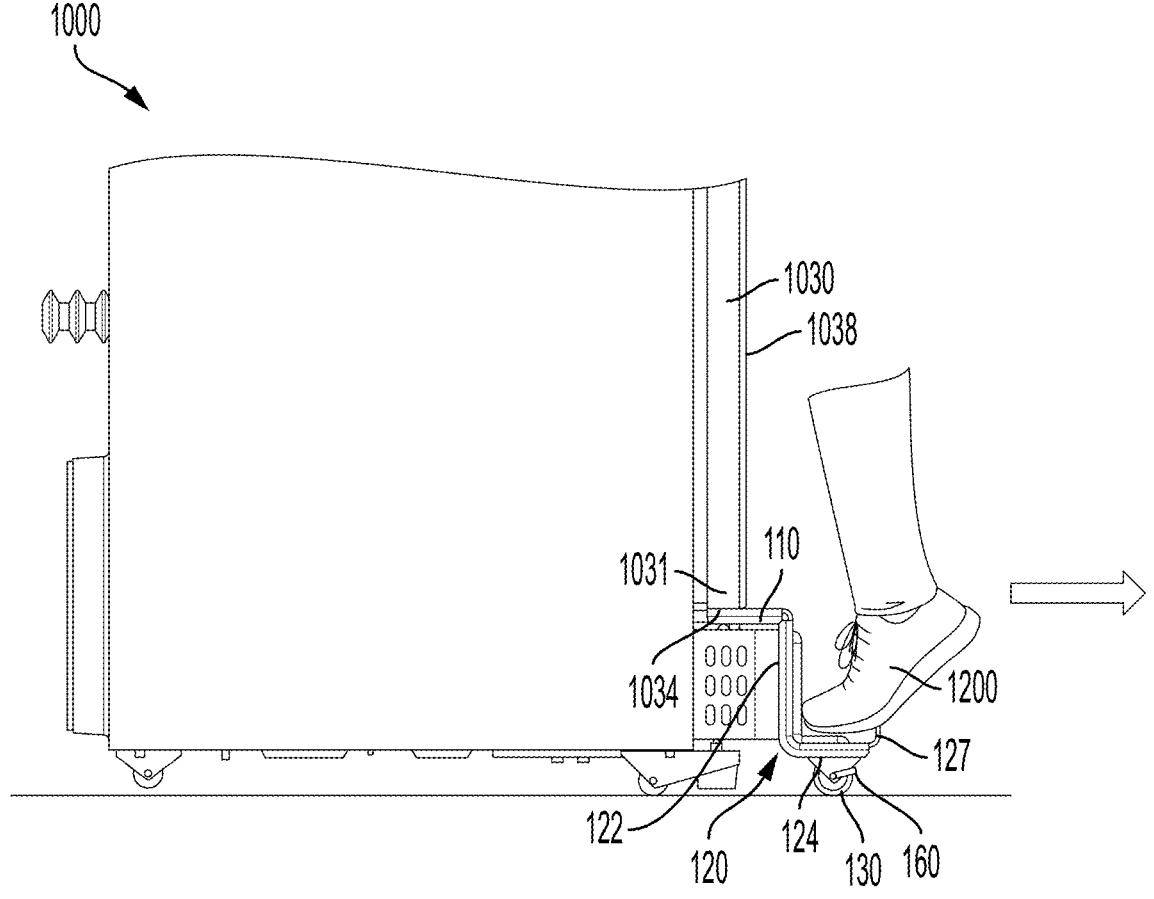
FIG. 3 shows a side view of the door opening assembly and product storage cabinet of FIG. 1 in use by a consumer to open the door of the product storage cabinet.

In some embodiments, mounting plate 110 may be secured to a lower surface 1034 of door 1030 at lower end 1031 of door 1030, as best shown in FIG. 3. Mounting door opening assembly 100 to lower surface 1034 of door 1030 may provide a mechanical advantage providing a strong and secure connection of door opening assembly 100 to door 1030, and may further serve to hide the fasteners used to secure mounting plate 110 to door 1030 from view of the consumer. However, in some embodiments, mounting plate 110 may be alternatively or additionally secured to a front surface 1038 of door 1030 at lower end 1031 of door 1030. Securing mounting plate 110 to front surface 1038 of door 1030 may facilitate installation of door opening assembly

Figure 7:
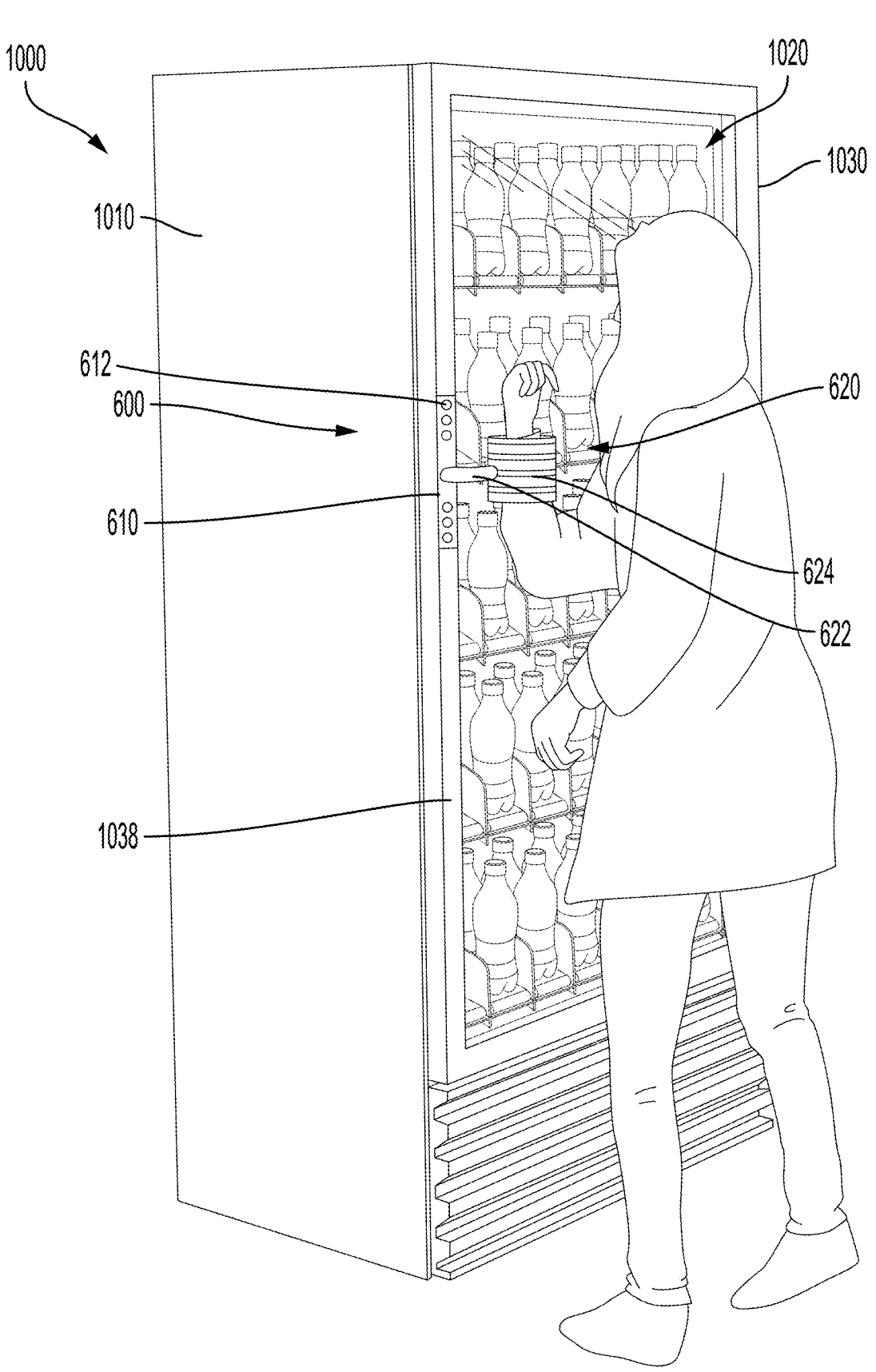
FIG. 7 shows a perspective view of a door opening assembly configured to be opened by an arm of a consumer according to an embodiment.

100 and may allow for height adjustment of door opening assembly 100 on door 1030, as discussed in further detail with respect to FIG. 7.

Mounting plate 110 may be secured to door 1030 via any of various fastening methods. In some embodiments, mounting plate 110 may be secured to door 1030 via mechanical fasteners, such as screws, nails, bolts, rivets, or the like, via the use of adhesives, epoxies or bonding agents, or may be secured via welding or braising, among other fastening methods.

Body 120 of door opening assembly 100 may include a first portion 122 connected to and extending from mounting plate 110, as shown in FIG. 2. Specifically, a first end 121 of first portion 122 may be connected to mounting plate 110 and may extend downwardly from mounting plate 110 and from door 1030. First portion 122 may be perpendicular to mounting plate 110. First portion 122 may include a second end 123 opposite first end 121 that is spaced above the ground when door opening assembly 100 is installed on a door 1030.

Body 120 of door opening assembly 100 may further include a second portion 124 connected to and extending from first portion 122. Specifically, a first end 125 of second portion 124 may be connected to second end 123 of first portion 122. Second portion 124 may extend perpendicularly from first portion 122 and may be parallel to a horizontal plane, such as the ground. Second portion 124 may extend in a direction away from cabinet 1000 and toward the consumer standing in front of cabinet 1000 (see, e.g., FIG. 3).

In order to open door 1030 of cabinet 1000, a consumer may place a bottom of his or her foot onto an upper surface 129 of second portion 124 and may apply a downward force on second portion 124 to maintain his or her foot in contact with second portion 124. The consumer may then pull outwardly from cabinet 1000 using his or her foot to open door 1030. The consumer may maintain his or her foot on door opening assembly 100 while retrieving products from product storage cabinet 1000, and when the consumer is finished retrieving products the consumer may remove his or her foot from door opening assembly 100 and allow door 1030 to close.

In some embodiments, body 120 of door opening assembly 100 may further include a flange 127 connected to and extending upwardly from second portion 124 of body 120. Specifically, flange 127 may extend from a second end 126 of second portion 124 opposite first end 125. Flange 127 may be arranged generally perpendicular to second portion 124 and parallel to first portion 122 of body 120. When a consumer places his or her foot on second portion 124, flange 127 to help the consumer pull door opening assembly 100 with his or her foot and may help to prevent the consumer's foot from slipping off of body 120 of door opening assembly 100. In some embodiments, body 120 may have an L-shape or a J-shape in a side view, as shown in FIG. 3.

In some embodiments, door opening assembly 100 may include a rib 140. Rib 140 may provide structural support to body 120 of door opening assembly 100. Rib 140 may be integrally formed on one or more of first portion 122, second portion 124, a surface of first portion 122, and flange 127. Rib 140 may extend in a direction from first end 121 to second end 123 of first portion 122, and in a direction of first end 125 to second end 126 of second portion 124.

Door opening assembly 100 may further include a surface engaging member 130 configured to engage the ground as door 1030 is opened. Surface engaging member 130 may have low-friction so as to move easily along the ground. In some embodiments, surface engaging member 130 may be a wheel that rolls along the ground as door 1030 is opened. In some embodiments, surface engaging member 130 may be a pad made of a low-friction material so that surface engaging member 130 slides on the ground. Surface engaging member 130 may facilitate opening of door 1030. Further, as consumer presses down on body 120 of door opening assembly 100, the downward force may cause cabinet 1000 to tilt forward toward the consumer presenting a risk of cabinet 1000 tipping over. Thus, surface engaging member 130 prevents downward force applied by consumer from causing a tipping of cabinet 1000.

In some embodiments, door opening assembly 100 may include a brake 160 (see, e.g., FIG. 3) configured to maintain door 1030 in an open position so that the consumer need not maintain his or her foot on door opening assembly 100 when door 1030 is moved to the open position. In this way, the consumer may use door opening assembly 100 to open door 1030, and may actuate brake 160 with his or her foot to hold door open while the consumer browses and retrieves products 1100 from product storage cabinet 1000. In some embodiments, brake 160 may be connected to a surface engaging member 130, such as a wheel, in order to prevent movement of surface engaging member 130, such as rolling of wheel when brake 160 is engaged. In some embodiments, brake 160 may include a leg that is movable from a stowed position to an extended position in which the leg engages the ground to prevent door 1030 from moving to the closed position.

Figure 4:
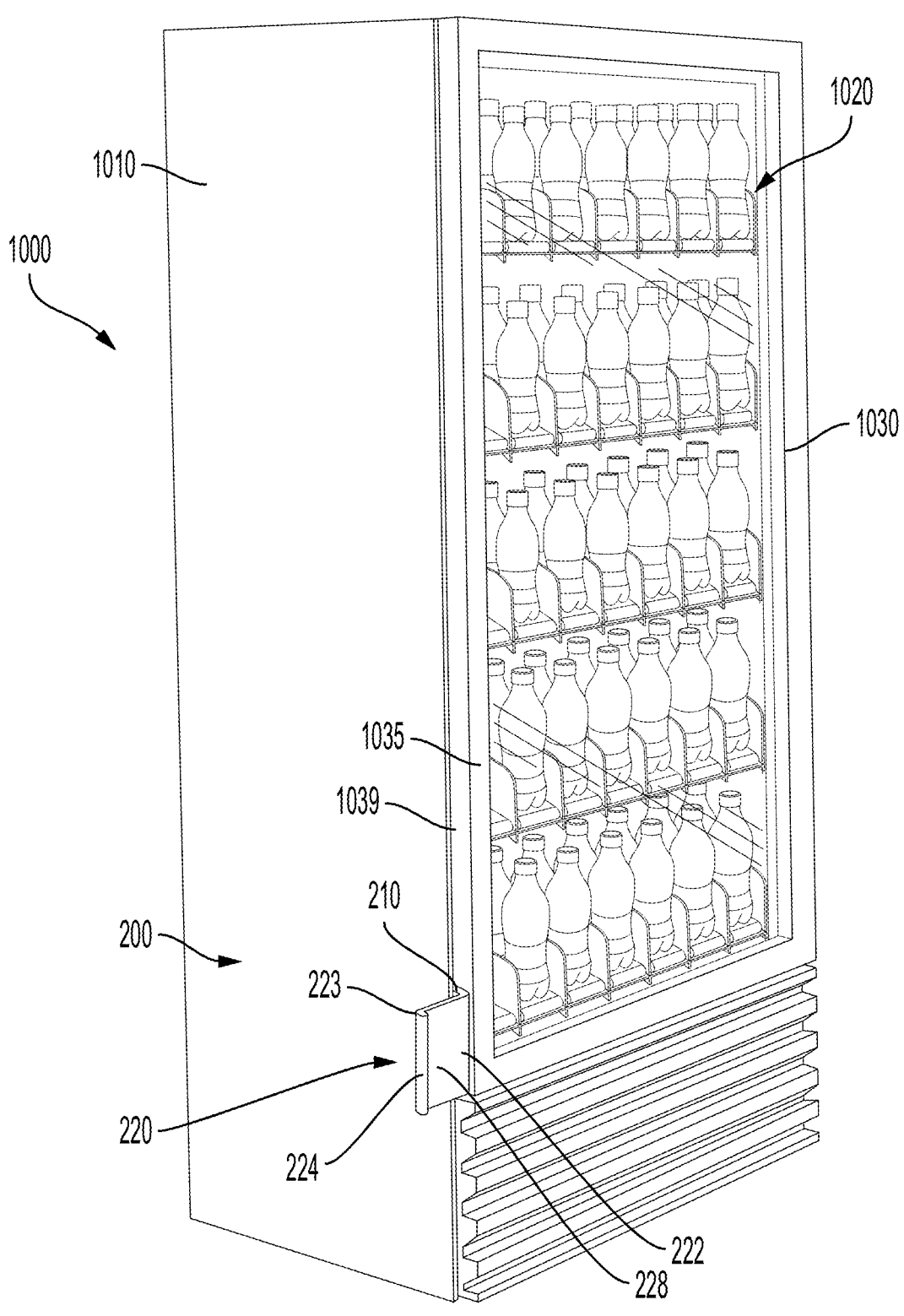
FIG. 4 shows a perspective view of a door opening assembly configured to be opened by a leg of a consumer according to an embodiment.

In some embodiments, a door opening assembly 200 configured to be opened with a leg of a consumer is shown for example in FIG. 4. Similar to door opening assembly 100, door opening assembly 200 includes a mounting plate 210 configured to be secured to door 1030, and a body 220 configured to be engaged by a body part of the consumer to open door 1030.

Mounting plate 210 may be secured to a side surface 1039 of door 1030 at a lower end 1031 of door 1030 so that door opening assembly 200 may be operated by a leg of a consumer. Door opening assembly 200 may extend along a portion of free side 1035 of door 1030 or may extend along substantially the entire free side 1035 of door 1030 from lower end 1031 toward or to upper end 1033 of door 1030. When door opening assembly 200 extends along substantially the entire free side 1035 of door 1030, door opening assembly 200 may be opened via an elbow or arm of a user. In such embodiments, door opening assembly 200 may be readily used by consumers of different height.

Mounting plate 210 may be secured via any of the fastening methods described above with respect to door opening assembly 100. Body 220 may include a first portion 222 connected to and extending from mounting plate 210. First portion 222 may be arranged perpendicularly to mounting plate 210 and parallel to a plane of door 1030. First portion 222 may extend outwardly from free side 1035 of door 1030 in a direction away from cabinet 1000. First portion 222 may include a front surface 228 facing the consumer, and a rear surface facing away from the consumer. In operation, a consumer may stand facing cabinet 1000, and may arrange his or her leg, particularly his or her calf, behind first portion 222 of body 220 so that the leg contacts the rear surface of first portion 222. The consumer may then move his or her leg toward themselves to open door 1030.

In some embodiments, body 220 may further include a lip 224 connected to and extending from an outer end 223 of first portion 222. Lip 224 may have a curvature, and may be rounded so that outer end 223 of first portion 222 is not sharp. In the event consumer's leg contacts outer end 223, rounded lip 224 may provide a smooth surface for the consumer's leg.

Figure 5:
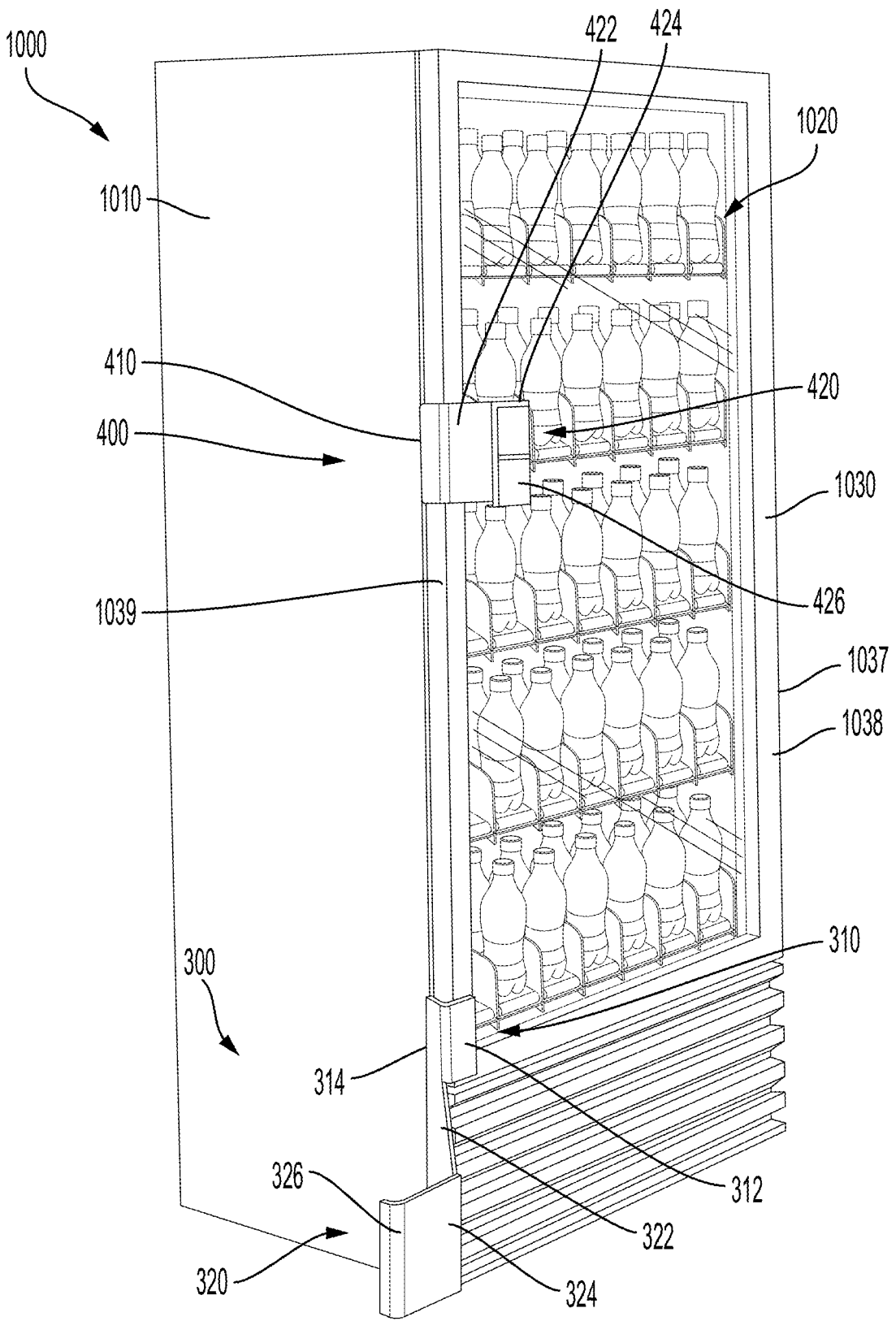
FIG. 5 shows a perspective view of a door opening assembly configured to be opened by a foot or an arm of a consumer according to an embodiment.

A door opening assembly 300 to be opened by a foot of a consumer is shown in FIG. 5. Door opening assembly 300 includes a mounting bracket 310 for securing door opening assembly 300 to door 1030 of cabinet 1000, and a body 320 configured to be engaged by a foot of a consumer to open door 1030. Mounting bracket 310 may be configured to be installed on a lower end 1031 of door 1030 and on a free side 1035 of door 1030 opposite the door hinge. Mounting bracket 310 may include a first portion 312 configured to be placed in contact with a front surface 1038 of door 1030, and a second portion 314 configured to be placed in contact with a side surface 1039 of door 1030. Mounting bracket 310 may be secured via any of the fastening methods described above with respect to door opening assembly 100.

Body 320 of door opening assembly 300 includes a first portion 322 connected to and extending from mounting bracket 310. First portion 322 may extend downwardly from mounting bracket 310 in a vertical direction toward the ground. Body 320 may further include a second portion 324 connected to and extending from first portion 322. Second portion 324 may be perpendicular to first portion 322 and parallel to a front surface 1038 of door 1030. In operation, a consumer standing in front of cabinet 1000 may place his or her foot in contact with a rear surface of second portion 324 of body 320, and particularly may place a heel in contact with a rear surface of second portion 324, and may pull their foot toward themselves in order to open door 1030.

In some embodiments, body 320 of door opening assembly 300 may further include a third portion 326 connected to and extending from second portion 324. Third portion 326 may extend rearwardly from second portion 324 in a direction away from a consumer standing in front of cabinet 1000. Third portion 326 may help to position the consumer's foot against second portion 324 and prevent the consumer's foot from slipping off of second portion 324 while opening door 1030.

A door opening assembly 400 configured to be engaged by an arm of a consumer may alternatively or additionally be secured to door 1030 of cabinet 1000, as shown in FIG. 5. In this way, a consumer may choose whether to use his or her foot or arm to open door 1030 of cabinet 1000, or the consumer may use both simultaneously. Door opening assembly 400 may include a mounting plate 410 for securing door opening assembly 400 to door 1030, and a body 420 configured to be engaged by a body part of the consumer to open door 1030 without the use of the consumer's hands. Mounting plate 410 may be secured to a side surface 1039 of door 1030. Mounting plate 410 may be secured to door 1030 via any of the fastening methods described with respect to mounting plate 110 of door opening assembly 100.

Body 420 of door opening assembly 400 may include a first portion 422 connected to and extending from mounting plate 410 toward hinge side 1037 of door 1030. First portion 422 may be arranged perpendicularly to mounting plate 410 and parallel to a plane of door 1030. Body 420 may include a second portion 424 connected to and extending from first portion 422 in a direction away from door 1030 and toward consumer standing in front of cabinet 1000. Second portion 424 may be perpendicular to first portion 422. A third portion 426 may be connected and extend from second portion 424 so that third portion 426 is parallel to a front surface 1038 of door 1030 and to first portion 422. Third portion 426 may extend from second portion 424 in a direction toward free side 1035 of door 1030. Third portion 426 may be perpendicular to second portion 424. Thus, body 420 may have a C-shape or U-shape in a top-down view. In use, a consumer may place an arm, such as a forearm in a space defined by body 420 with the forearm arranged in a vertical orientation, allowing the consumer to open the door using a natural motion. Further, the consumer may access the space defined by body 420 via free side 1035 of door 1030. The consumer may then move their forearm toward themselves to pull body 420 of door opening assembly 400 and open door 1030.

Figure 6:
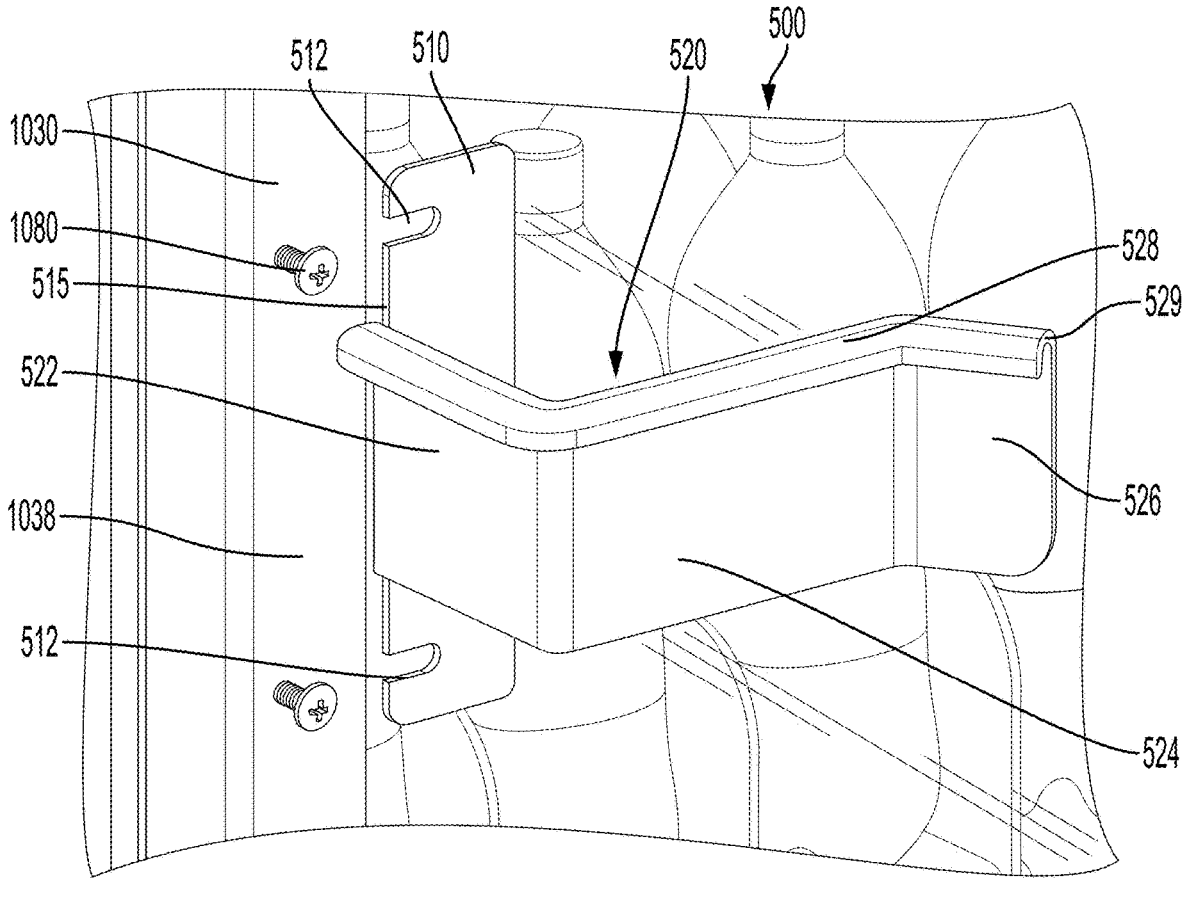
FIG. 6 shows a perspective view of a door opening assembly configured to be opened by an arm of a consumer according to an embodiment.

A door opening assembly 500 configured to be opened by an arm of a consumer is shown for example in FIG. 6. Door opening assembly 500 may include a mounting plate 510 configured to secure assembly 500 to door 1030, and a body 520 configured to be engaged by an arm of a consumer to open door 1030. Mounting plate 510 may be secured to a front surface 1038 of door 1030. Mounting plate 410 may be secured to door 1030 via any of the fastening methods described with respect to mounting plate 110 of door opening assembly 100. In some embodiments, mounting plate 510 may include one or more apertures 512 for receiving a fastener 1080 therethrough. In some embodiments, apertures 512 may be arranged along an edge 515 of mounting plate 510. In this way, fasteners on door 1030 need not be fully removed when installing door opening assembly 500. Instead, fasteners may simply be loosened or partially unscrewed so that apertures 512 may be arranged around the shaft of the fasteners, and fasteners may then be tightened to secure mounting plate 510. Apertures 512 may have a maximum diameter that is sized to accommodate a threaded portion of a fastener 1080, such as a screw, and that is smaller than a diameter of the head of the fastener 1080 so that head of fastener 1080 holds mounting plate 510 in place on door 1030.

Body 520 may include a first portion 522 connected to and extending from mounting plate 510. First portion 522 may be arranged generally perpendicular to mounting plate 510 and may extend in a direction toward a consumer standing in front of cabinet 1000. Body 520 may further include a second portion 524 connected to and extending from first portion 522 in a direction toward hinge side of door 1030. Second portion 524 may be arranged generally perpendicularly to first portion 522 and parallel to front surface 1038 of door 1030. In this way, a space for receiving a consumer's forearm may be defined between door 530 and second portion 524 of body 520. In some embodiments, body 520 may further include a third portion 526 connected to and extending from second portion 524 of body 520. Third portion 526 may extend in a direction away from door 1030 and cabinet 1000. Third portion 526 may be arranged at an angle relative to second portion 524. In this way, third portion 526 may help to guide the arm of the consumer toward the space defined between second portion 524 and door 1030. The consumer may insert their forearm into the space between the body 520 and door 1030 from a hinge side 1037 of door 1030 with the consumer's forearm in a vertical orientation. In some embodiments, body 520 may further include a lip 528 at an upper end 529 of body 520. Lip 528 may have a curved shape so that body 520 has a hook-shape in a transverse cross sectional view. Lip 528 may provide a smooth surface at upper end 529 of body 520 so that body 520 is not sharp and does not catch on a consumer's clothes.

A door opening assembly 600 configured to allow a consumer to open a door using an arm is shown in FIG. 7. Door opening assembly 600 includes a mounting plate 610 configured to secure door opening assembly 600 to door 1030, and a body 620 configured to receive an arm of a consumer, such as a forearm. Mounting plate 610 may be secured to door 1030, such as to front surface 1038 of door 1030. Mounting plate 610 may be secured to door 1030 via any of the fastening methods describe above with respect to door opening assembly 100. In some embodiments, mounting plate 610 may include a plurality of apertures 612 for receiving fasteners to secure mounting plate 610 to door 1030. Apertures 612 may be spaced along a longitudinal axis of mounting plate 610. During installation, a user can select which of the plurality of apertures 612 to use to secure mounting plate 610 to door in order to install door opening assembly 600 at a desired height on door 1030. As door 1030 may already have pre-drilled holes for receiving fasteners, selecting which apertures 612 of mounting plate 610 to use to secure door opening assembly 600 to door 1030 allows for height adjustment of door opening assembly 600 without the need to form new holes in door 1030.

Body 620 of door opening assembly 600 may include a first portion 622 connected to and extending from mounting plate 610. Body 620 may further include a second portion 624 connected to and extending from first portion 622. Second portion 624 may have a C-shaped transverse cross sectional area and in a top-down view. Second portion 624 may be shaped as a portion of a tube. Second portion 624 may be configured to receive a forearm of a consumer in a vertical orientation, and the consumer may pull second portion 624 with his or her forearm to open door 1030.

Figure 8:
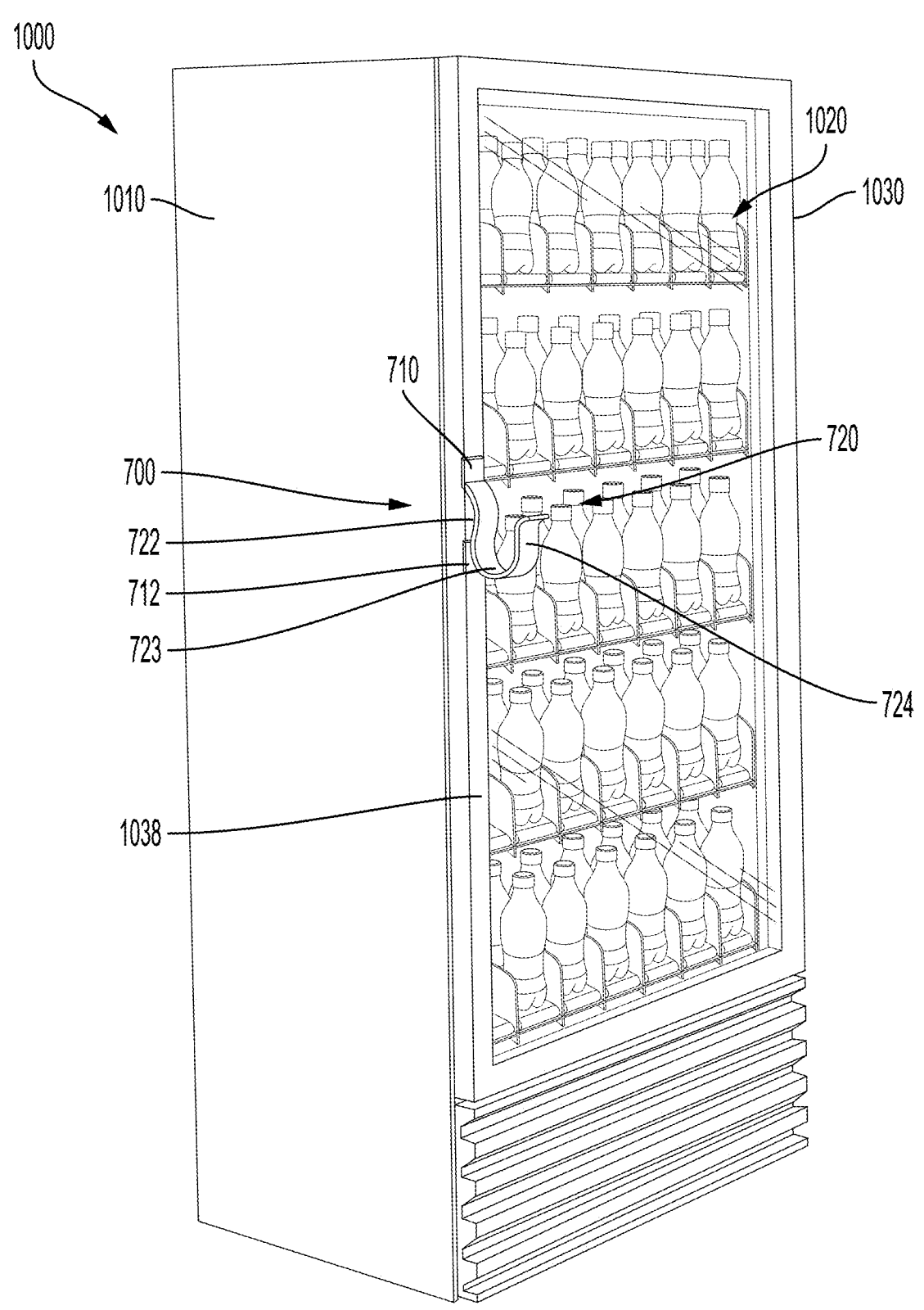
FIG. 8 shows a perspective view of a door opening assembly configured to be opened by an arm of a consumer according to an embodiment.

A door opening assembly 700 configured to be opened with an arm is shown in FIG. 8. Door opening assembly 700 may include a first mounting plate 710 and a second mounting plate 712 configured to secure assembly 700 to door 1030, and a body 720 configured to be engaged by an arm of a consumer to open door 1030.

First mounting plate 710 may be secured to a front surface 1038 of door 1030. Body 720 may include a first portion 722 that extends from mounting plate 710 in a downward direction. Body 720 may be connected to a second mounting plate 712 at a lower end 723 of first portion 722. Second mounting plate 712 may be secured to a front surface 1038 of door 1030. Second mounting plate 712 may be vertically aligned with first mounting plate 710 and may be arranged below first mounting plate 710. Mounting plates 710, 712 may be secured to door 1030 via any of the fastening methods describe above with respect to door opening assembly 100.

Body 720 may include a second portion 724 that curves upward from lower end 723 of first portion 722. Thus, body 720 may have a generally U-shaped configuration in a side view. Body 720 may be configured to receive a forearm of a consumer in a horizontal orientation, and the space defined by body 720 may be accessed from an upper end of body 720.

In any of the embodiments described herein, mounting plate and body of door opening assembly 100, 200, 300, 400, 500, 600, 700 may be integrally formed. Door opening assembly 100, 200, 300, 400, 500, 600, 700 may be formed from a metal sheet, such as by stamping or cutting the metal sheet to a desired shape, and/or by bending the metal sheet into the final geometry described herein. Door opening assembly 100, 200, 300, 400, 500, 600, 700 may be formed from a metal, such as aluminum or steel, such as galvanized steel or stainless steel, among other materials. In some embodiments, door opening assembly may be formed from a molded plastic.

Figure 9:
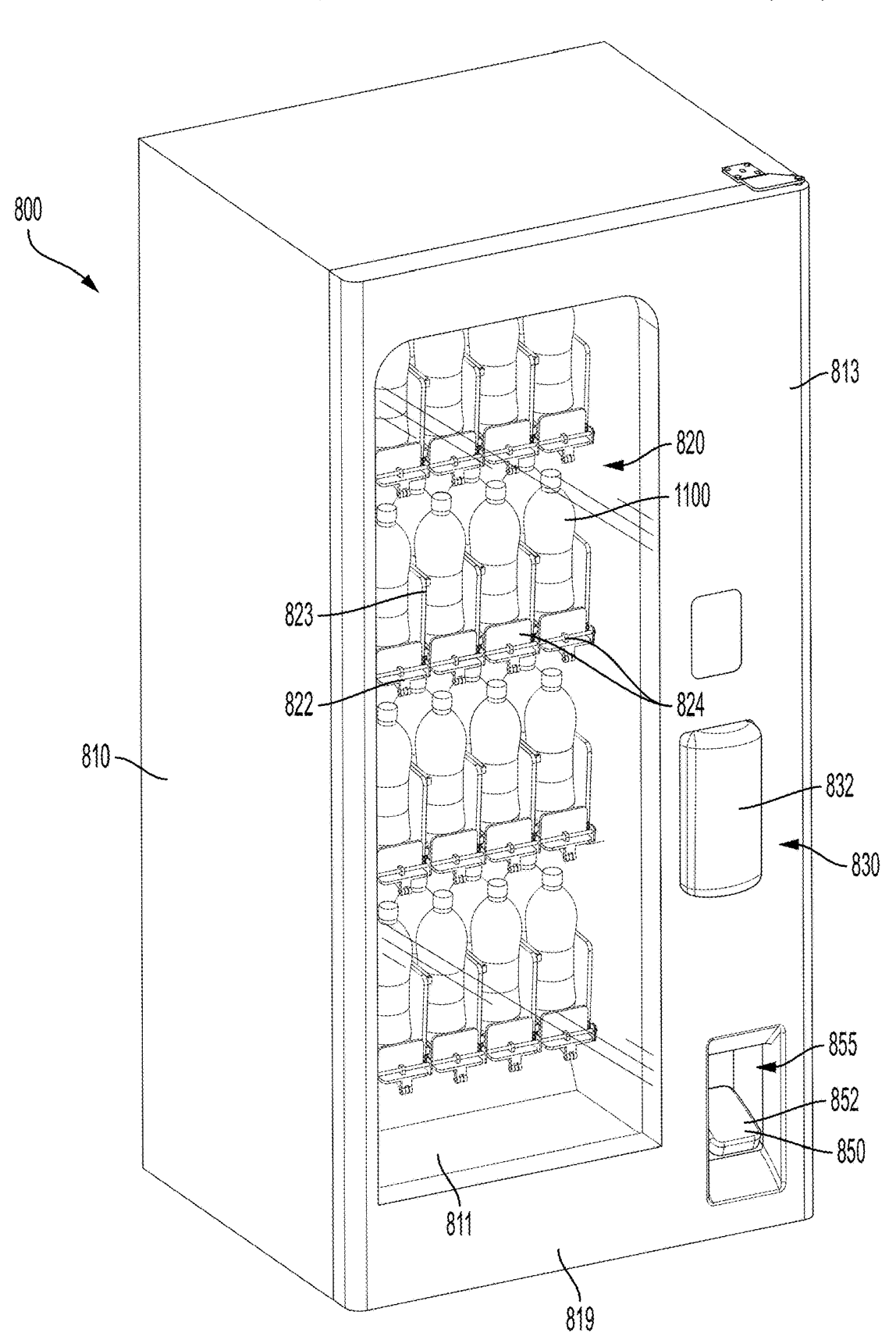
FIG. 9 shows a perspective view of a pedal-operated vending machine according to an embodiment.

In addition to retrieving products from product storage cabinets, consumers may also use vending machines to purchase products. While vending machines allow consumers to purchase a product without interacting with another person, such as a cashier, the consumer may still be exposed to germs when operating the vending machine. In order to allow a consumer to operate a vending machine without the use of their hands, a vending machine 800 may be operated by one or more pedals 850, as shown in FIG. 9.

Vending machine 800 may include a housing 810 that defines a product storage area 820 for storing products. Vending machine 800 may be used to store and dispense any of various products, such as packaged beverages and snack items, among other products. Housing 810 may further define a delivery portal 830 that receives a product dispensed from product storage area 820 and that provides a consumer with access to the dispensed product. Delivery portal 830 may be movably covered by a door 832. A dispensing mechanism may be configured to convey the product from product storage area 820 to delivery portal 830 for access by the consumer. Vending machine 800 may include a pedal 850 that may be actuated by a foot of a consumer to allow the consumer to carry out one or more aspects of the vending operation in a hands-free manner, as discussed in further detail herein.

Housing 810 of vending machine 800 may have a lower wall, an upper wall, and a plurality of sidewalls 813. One sidewall 813, such as a front sidewall, may be a door to provide access to product storage area 820 of vending machine 800 to allow restocking of vending machine 800. In some embodiments, housing 810 may be shaped as a rectangular prism. However, in other embodiments, housing 810 may have various geometries, and may have one or more rounded or curved sidewalls. In some embodiments, housing 810 includes a transparent portion 811 on a sidewall 813, such as on the front wall, that allows consumers to view products 1100 within product storage area 820 from an exterior of vending machine 800.

Product storage area 820 of vending machine 800 may include one or more shelves 822 on which products 1100 are arranged. Shelves 822 may be vertically spaced within product storage area 820 such that shelves 822 are located at different elevations. Products 1100 may be arranged in one or more rows 824 on each shelf 822. Each row 824 of a shelf 822 may be separated by a divider 823 to maintain products within their respective rows 824.

A dispensing mechanism 840 may be configured to convey a product from product storage area 820 to delivery portal 830. In some embodiments, a dispensing mechanism 840 may be arranged on each shelf 822, or on each row 824 of each shelf 822. In some embodiments, a single dispensing mechanism 840 may be configured to retrieve and convey a product from any shelf 822 or row 824 to delivery portal 830.

In some embodiments, dispensing mechanism 840 may include a screw-drive configured to rotate to advance a product 1100 in a row 824 toward the front of the row 824 where the product 1100 may fall under the force of gravity to delivery portal 830. In such embodiments, each row 824 may have its own dispensing mechanism 840. In some embodiments, dispensing mechanism 840 may be a pusher that includes a tab at a rear of each row 824 that applies a force on products 1100 in the row 824 to advance the products 1100 toward a front of the row 824. Each row 824 may further include a gate at a front of the row 824 that is configured to stop the advance of products 1100. When a consumer selects a product, gate may open to allow the product to fall from the row 824 under the force of gravity, or the product may be retrieved by another mechanism that conveys the product to delivery portal 830. In some embodiments, dispensing mechanism 840 may include a robotic arm configured to move to the location of the product, retrieve the product, and convey the product to the delivery portal 830. In some embodiments, dispensing mechanism 840 may include a movable cup configured to receive the product from a row 824 of a shelf 822 in product storage area 820 and transport the product to delivery portal 830. The cup may be movable via an X-Y mechanism. The product may be moved from shelf 822 into the cup via another dispensing mechanism on shelf 822. Thus, any of various dispensing mechanisms 840 known in the art may be used to convey products to delivery portal 830.

Vending machine 800 includes one or more pedals 850 configured to be operated by a foot of a consumer. Pedal 850 may be located at lower end 819 of housing 810 to facilitate operation of pedal 850 by a foot of the consumer. In some embodiments, pedal 850 may be located adjacent ground-level, such as within one foot of the ground. In some embodiments, pedal 850 may be disposed on housing 810 below delivery portal 830. In some embodiments, pedal 850 may be located in a recessed area 855 of housing 810. In this way, pedal 850 may not extend outward beyond a sidewall 813 of housing 810 so that pedal 850 does not increase the footprint of vending machine 800 and eliminates the risk of a consumer tripping over or accidentally operating pedal 850. Pedal 850 may include a plate 852 and a consumer may place a bottom of their foot on plate 852 to apply a downward force to operate pedal 850. Plate 852 of pedal 850 may be arranged generally horizontally or may be arranged at an inclined angle relative to a horizontal plane to facilitate placement of the bottom of the foot on pedal 850, as shown in FIG. 9. However, in some embodiments, pedal 850 may have other configurations that allow the consumer to use their foot to apply a force to operate pedal 850.

Figure 10:
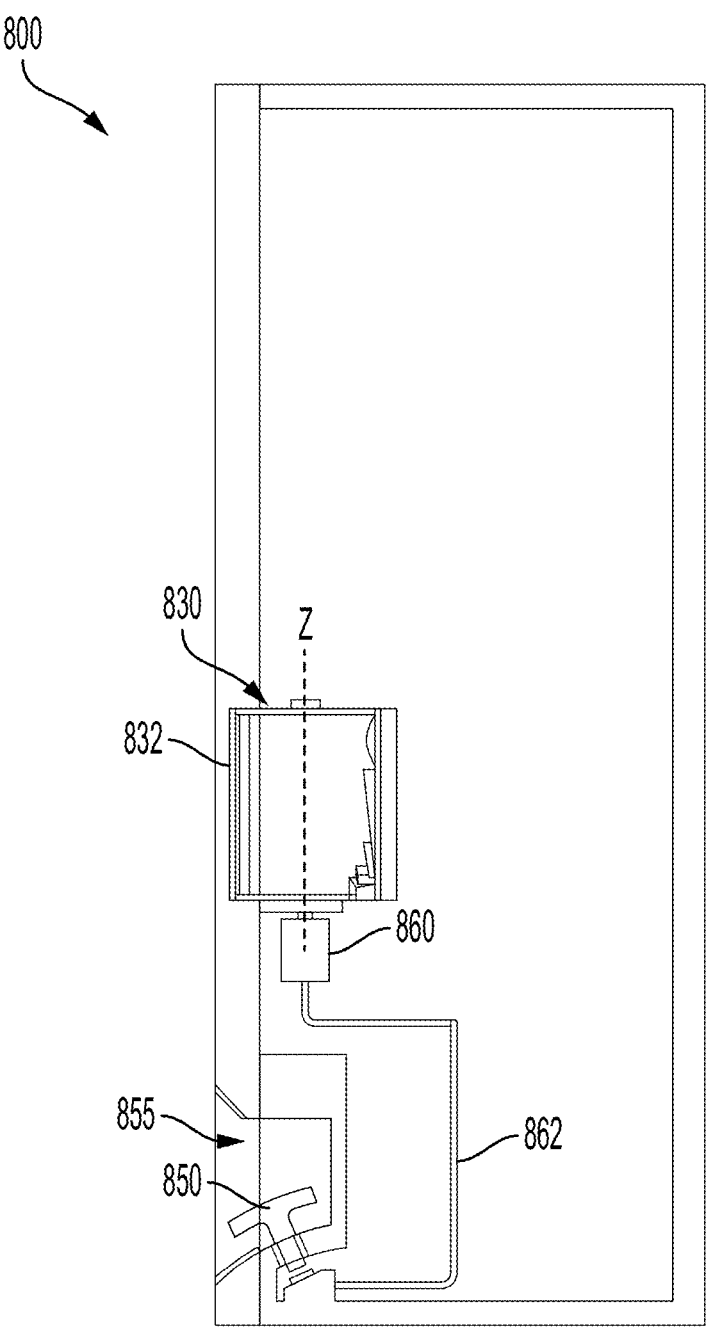
FIG. 10 shows a cross sectional view of a pedal-operated vending machine according to an embodiment.

In some embodiments, pedal 850 of vending machine 800 may control opening of a door 832 of delivery portal 830, as shown in FIG. 10. Door 832 may be movable from a closed position in which door 832 covers delivery portal 830 so that delivery portal 830 is not accessible, to an open position in which door 832 uncovers delivery portal 830 so that delivery portal 830, and a product therein, may be accessed by a consumer. Door 832 may rotate about an axis, such as along Z-axis of delivery portal 830, door 832 may slide along tracks, or door 832 may pivot about a hinge connecting door 832 to housing 810.

Specifically, in some embodiments, pedal 850 may be operably connected to a motor 860, such as by an electrical or mechanical linkage 862. Linkage 862 may be mechanical and may include one or more lever arms, pivots, hinges, cams, or gears, or a combination thereof. Linkage 862 may be electrical and may include an electrically conductive wire or wires. Motor 860 may be configured to cause door 832 to move from the closed position to the open position and vice versa. Motor 860 may for example cause door 832 to rotate about Z-axis. In some embodiments, linkage 862 may be mechanically connected to door 832 so that operation of pedal 850 causes linkage 862 to open door 832 without the use of a motor.

Figure 11:
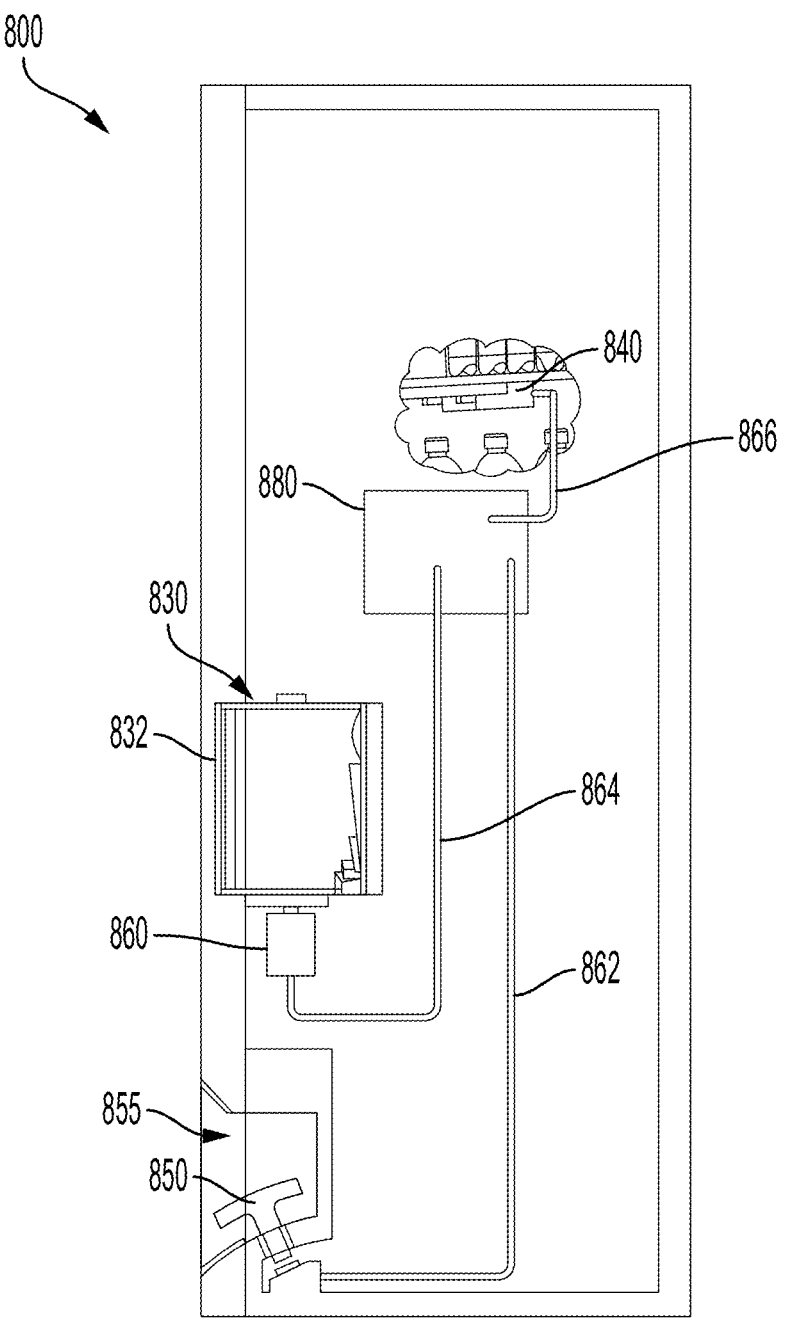
FIG. 11 shows a cross sectional view of a pedal-operated vending machine according to an embodiment.

In some embodiments, pedal 850 may control dispensing mechanism 840, as shown in FIG. 11. Pedal 850 may be connected to dispensing mechanism 840 via electrical or mechanical linkages as discussed above with respect to FIG. 10. In some embodiments, pedal 850 may be in communication with a control unit 880, and control unit 880 may be in communication with dispensing mechanism 840 such that operating pedal 850 sends an electrical signal to control unit 880 to actuate dispensing mechanism 840. Control unit 880 may alternatively or additionally be in communication with a motor 860 that controls door 832. Thus, pedal 850 may control door 832 and/or dispensing mechanism 840. Pedal 850 may be in communication with control unit 880 via a wire, and control unit 880 may be in communication with dispensing mechanism 840 and/or a motor 860 that operates door 832 via wires 866, 864, respectively.

In some embodiments, a single pedal 850 may control both dispensing mechanism 840 and door 832. In such embodiments, pressing pedal 850 a single time may cause the product to be dispensed and also door 832 to open, simultaneously or in succession. Upon pressing pedal 850, control unit 880 may actuate dispensing mechanism 840 and may then actuate door 832 after a predetermined period of time, or may actuate door 832 when product is received in delivery portal 830. In such embodiments, a sensor may be used to determine when product is received within delivery portal 830. Alternatively, pedal 850 may be pressed a first time to actuate dispensing mechanism 840 to dispense the product to delivery portal 830, and the consumer may press pedal 850 a second time to open door 832. However, in some embodiments, vending machine 800 may include a pedal 850 for actuating dispensing mechanism 840, and a separate pedal for opening door 832 of delivery portal 830.

In some embodiments in which vending machine 800 includes only a single pedal 850, vending machine 800 may store a single type of product such that no product selection is required. Pedal 850 may actuate dispensing mechanism 840 to convey a product to delivery portal 830. In some embodiments, pedal 850 may be pressed a first time to dispense one product, and may be pressed a second time to dispense a second product, and so on. The consumer may be charged for the number of products dispensed based on the number of times the pedal is pressed. In some embodiments, vending machine 800 may only allow one product to be purchased at a time, and thus pedal 850 may be operated only once and subsequent pedal 850 presses may have no effect until a new transaction is initiated.

Figure 12:
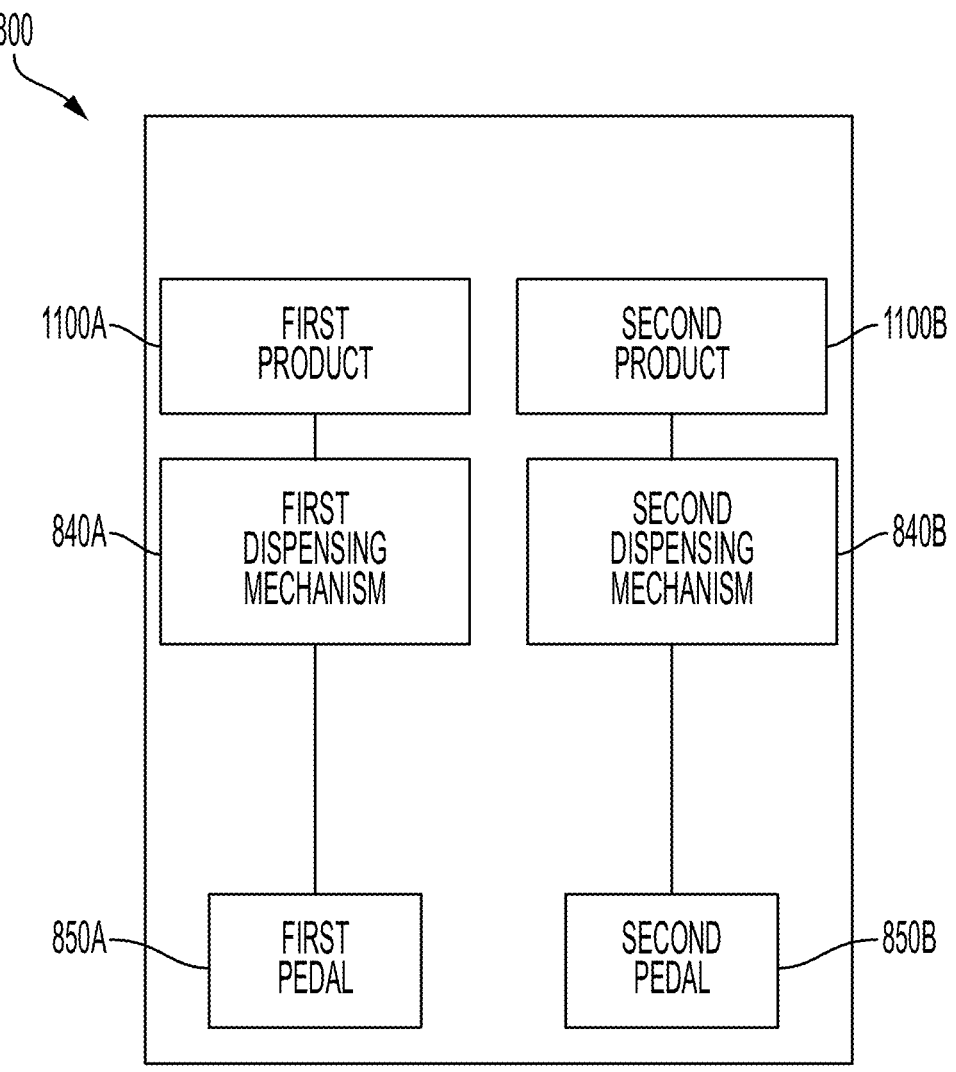
FIG. 12 shows a schematic block diagram of components of a pedal-operated vending machine having multiple pedals according to an embodiment.

In some embodiments, vending machine 800 may include a plurality of pedals 850A, 850B, as shown in FIG. 12. Each pedal 850A, 850B may correspond to a different product to be dispensed. In one embodiment, a first pedal 850A may be connected to a first dispensing mechanism 840A associated with a first product 1100A, and a second pedal 850B may be connected to a second dispensing mechanism 840B associated with a second product 1100B. Thus, the consumer may operate the first pedal 850A if desired to dispense the first product 1100A, or may operate the second pedal 850B if desired to dispense the second product 1100B. Additional pedals may be included for each type of product available to be dispensed. In such embodiments, pedals 850A, 850B may each include a label to indicate what product is dispensed by operating the pedal. In some embodiments, a pedal may correspond to a single shelf 822 or row 824 of vending machine 800 (see e.g., FIG. 9). For example, in some embodiments, operating a first pedal may cause a product on a first shelf 822 to be dispensed, and operating a second pedal may cause a second product on a second shelf 822 to be dispensed.

Figure 13:
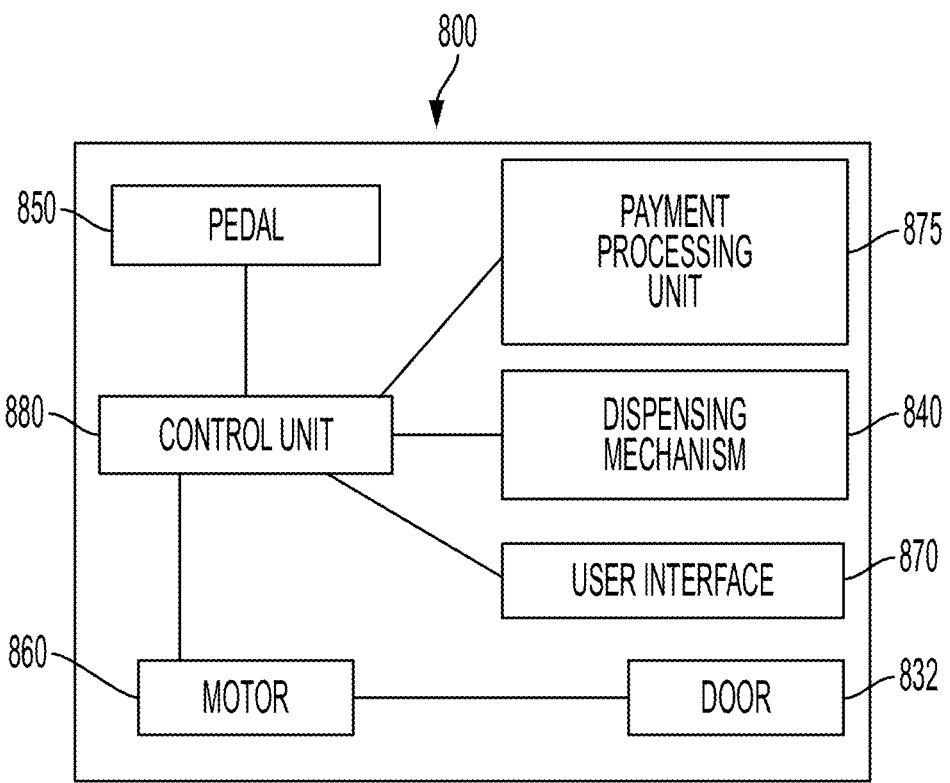
FIG. 13 shows a schematic block diagram of components of a pedal-operated vending machine according to an embodiment.

In some embodiments, vending machine 800 may include a user interface 870 configured to receive a user input of a beverage selection, as shown in FIG. 13. Control unit 880 of vending machine 800 may be in communication with dispensing mechanisms 840 associated with each product.

Thus, when a consumer makes a product selection and operates pedal 850, control unit 880 may actuate a dispensing mechanism 840 corresponding to the product selected by the consumer via user interface 870.

In some embodiments, vending machine 800 may further include a payment processing unit 875 configured to receive a source of payment from a consumer. In some embodiments, payment processing unit 875 may include a slot configured to receive paper bills, coins or tokens, a card reader to read a magnetic stripe or electronic chip of a payment card, such as a credit card, debit card, gift card, or the like. Payment processing unit 875 may include contactless payment options, such as a near field communication (NFC) antenna configured to detect a contactless payment card, a transceiver capable of communicating with a portable electronic device, such as a smartphone, smartwatch, tablet or the like, for receiving electronic payment (e.g., PayPal or cryptocurrency); a scanner configured to scan a code on a portable electronic device to receive mobile payment from a consumer (e.g., Apple Pay or Google Pay). In this way, the consumer can make a payment without having to contact vending machine 800 as may be required to insert coils or paper bills or to when using a payment card. Alternatively, vending machine 800 may include a sensor to identify a consumer and access a consumer account having a payment source based on the detected consumer identity. Vending machine 800 may identify the consumer via facial recognition, voice recognition, or other biometric recognition, or by communicating with the consumer's portable electronic device, or by scanning a code displayed on the portable electronic device or receiving a signal or communication from the portable electronic device. In this way, the consumer need not provide a payment source at the time of purchase, and the consumer's account may be charged for the dispensed product. The consumer's account may be associated to a payment source or method, or the account may have a preloaded balance.

Once payment is accepted by payment processing unit 875, consumer may operate pedal 850 to dispense a product. Pedal 850 may be non-operable until payment is received. In some embodiments, consumer may operate pedal 850 to open a door 832 of delivery portal 830 as described above.

Figure 14:
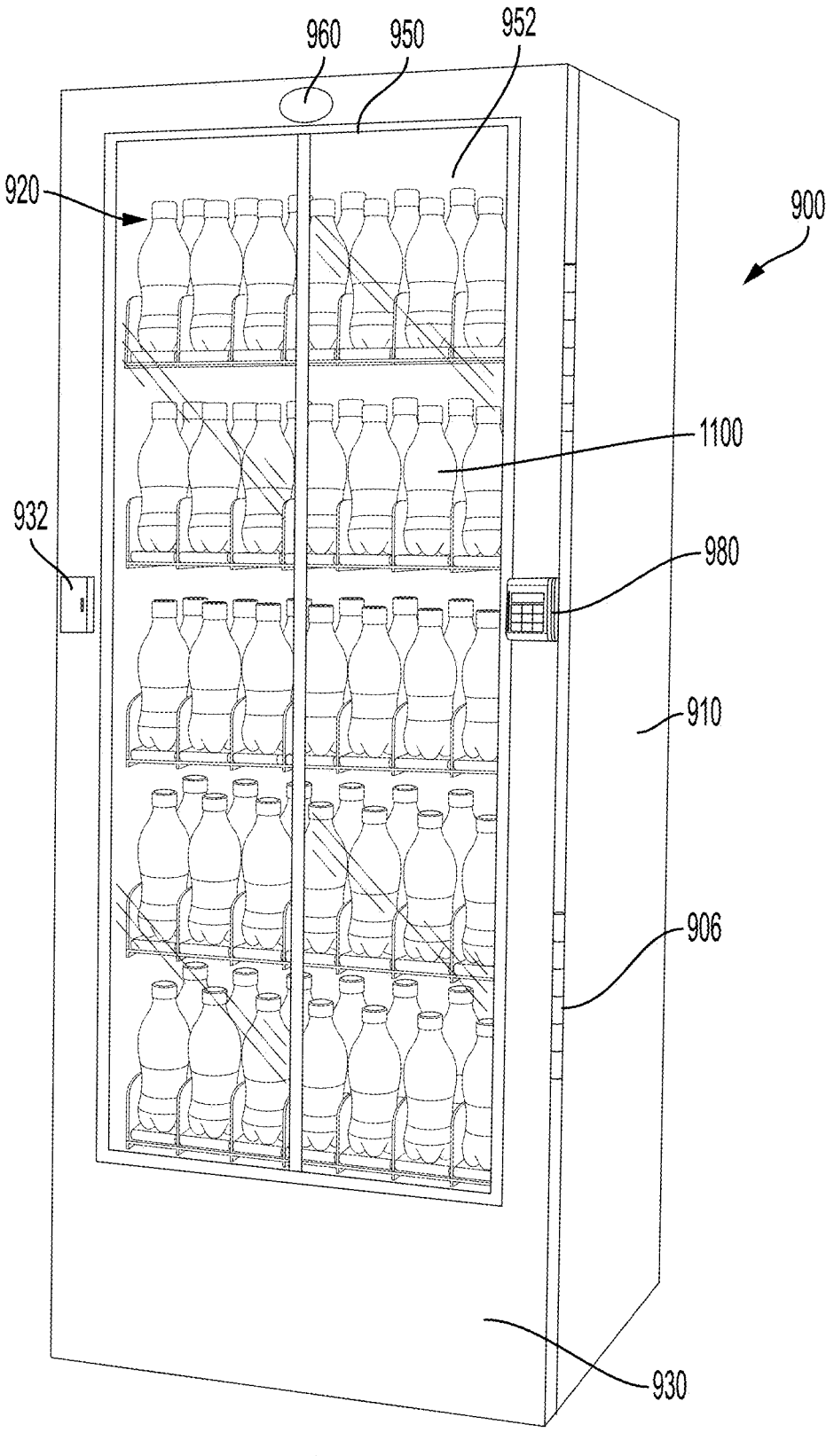
FIG. 14 shows a perspective view of a hands-free product storage cabinet according to an embodiment.
Figure 15:
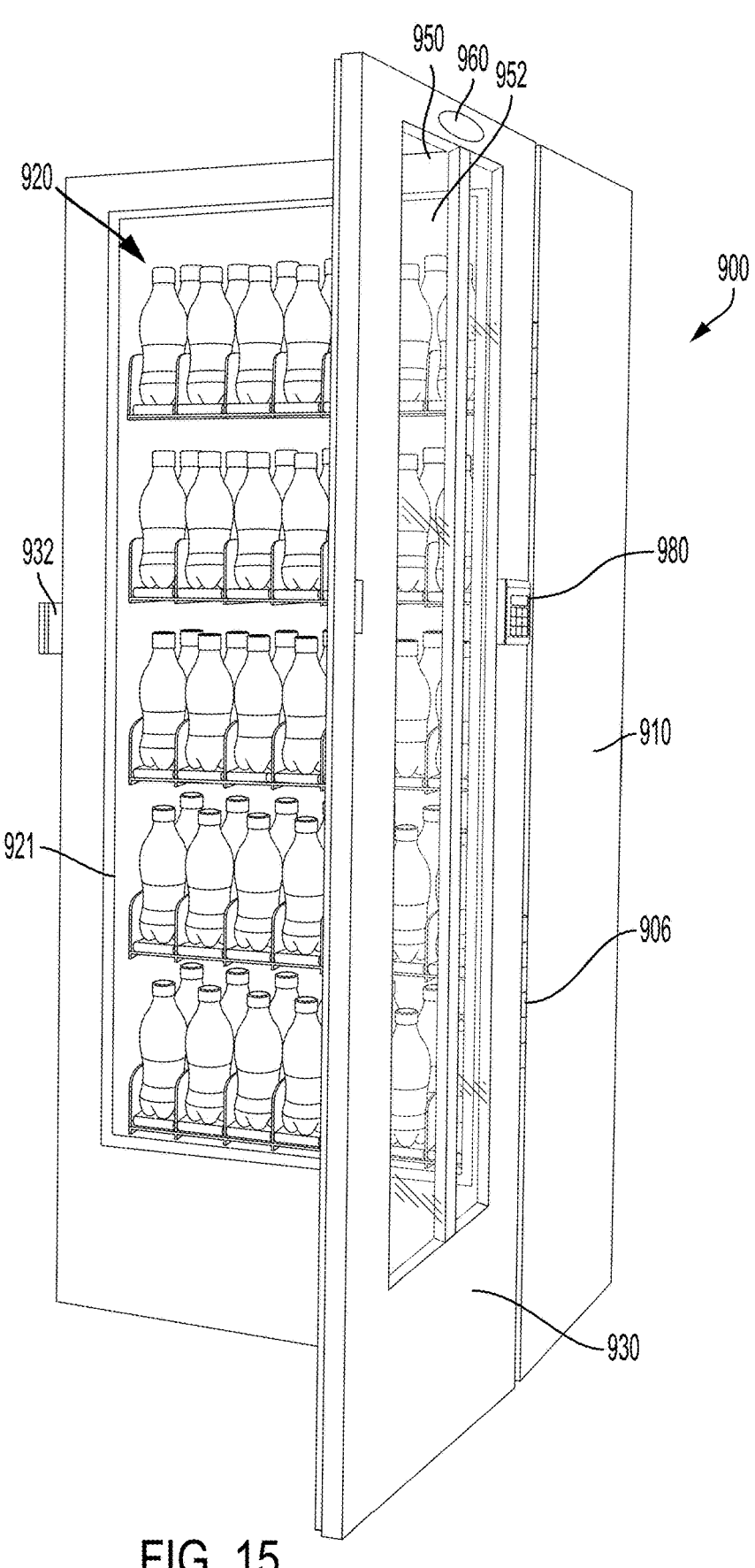
FIG. 15 shows a perspective view of the hands-free product storage cabinet of FIG. 14 with the front wall in an open configuration.

Some embodiments described herein relate to a hands-free product storage cabinet 900, as shown in FIGS. 14 and 15. Product storage cabinet 900 may include a housing 910 defining a product storage area 920. Product storage area 920 may have an open front portion 921 that is removably covered by a front wall 930. Front wall 930 may be connected to housing 910 via a hinge 906 so as to rotate from a closed position in which front wall 930 covers open front portion 921 and an open position in which front wall 930 rotates away from housing 910 to allow access to product storage area 920. Moving front wall 930 to the open position may facilitate loading of product storage area 920 by an operator of cabinet 900. Front wall 930 may be secured in closed position by a lock 932 to prevent front wall 930 from being opened by a consumer.

Front wall 930 may include one or more doors 950 that are movable from a closed position to an open position to provide a consumer with access to product storage area 920. Door 950 may move from open position to closed position and vice versa by sliding on a track mounted on front wall 930. Door 950 may include a transparent portion 952 configured to allow consumers to view product storage area 920 and products 1100 therein without opening door 950.

In some embodiments, cabinet 900 includes a sensor 960 configured to detect a presence of a consumer. Sensor 960 may be a motion sensor, a proximity sensor, or an infrared sensor, among other sensors that allow for detection of a consumer near cabinet 900. In some embodiments, sensor 960 may be a microphone configured to detect audio, such as a command from a consumer to open the door. Thus, a consumer may cause door of cabinet to open by a voice command. In some embodiments, sensor 960 may be configured to detect a gesture performed by a consumer to open door 950.

When a presence of a consumer is detected by sensor 960, door 950 may automatically move, such as by sliding, from closed position to the open position. Door 950 may be automatically moved from the closed position to the open position by a drive mechanism, such as a motor. The consumer may then retrieve the desired product from product storage cabinet 900.

In some embodiments, door 950 may be configured to remain open for a predetermined period of time and may automatically shut or attempt to shut once the predetermined period of time has expired. In some embodiments, such as when sensor 960 is a motion, proximity or infrared sensor, door 950 may remain open as long as sensor 960 continues to detect a presence of the consumer. Sensor 960 may continuously monitor for the presence of a consumer or may check at intervals, e.g., once per 60 seconds, 30 seconds, 15 seconds, etc.

In some embodiments, product storage cabinet 900 may further include a payment processing unit 980. In such embodiments, product storage cabinet 900 may function as a vending machine. Payment processing unit 980 may have the same features as discussed above with respect to payment processing unit 875 of vending machine 800. Product storage cabinet 900 may authenticate the consumer's identity or receive a payment source prior to opening door 950 of cabinet 900.

Figure 16:
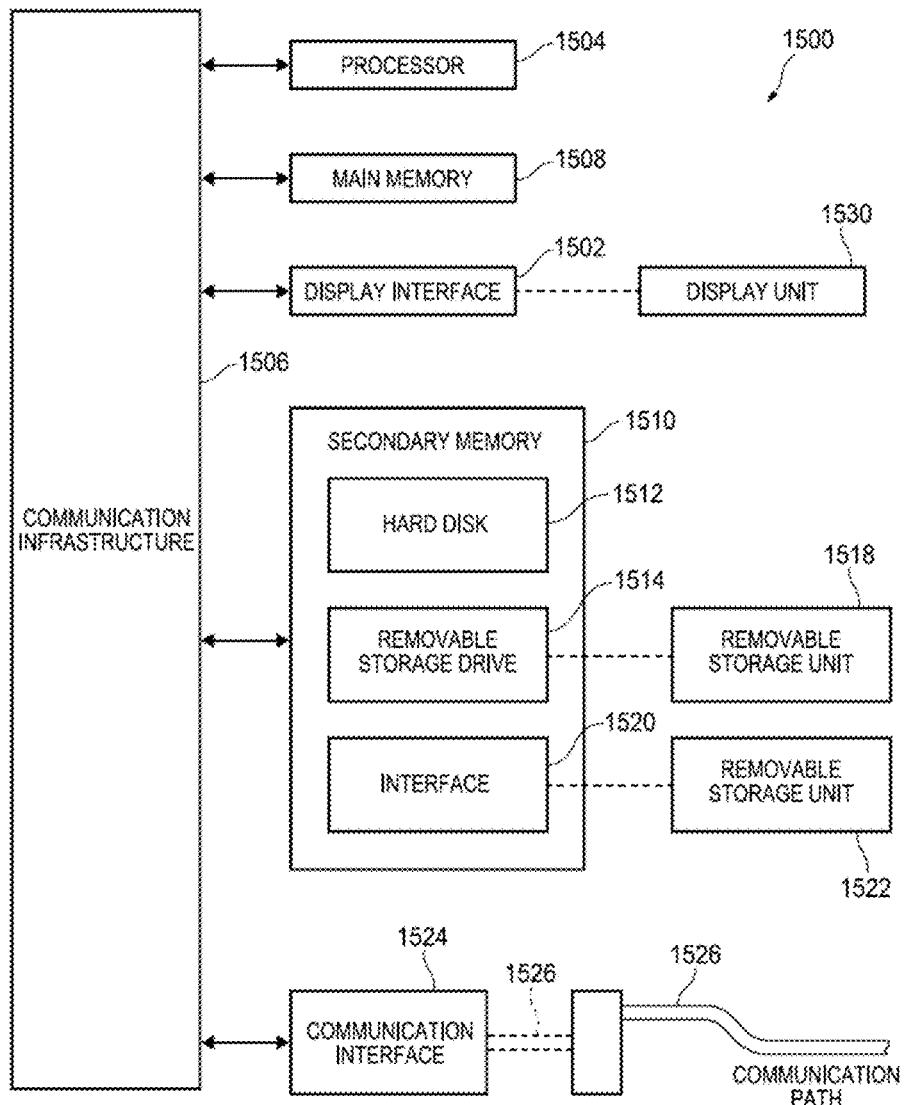
FIG. 16 shows a schematic block diagram of an exemplary computer system for carrying out embodiments.

FIG. 16 illustrates an exemplary computer system 1500 in which embodiments, or portions thereof, may be implemented as computer-readable code. Control unit 880 as discussed herein may be computer systems having all or some of the components of computer system 1500 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 1500. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In some embodiments, edge computing, cloud computing, or a combination thereof may be used. In addition, in some embodiments the order of operations may be rearranged without departing from the spirit of the disclosed subject matter.

Processor device 1504 may be a special purpose or a general purpose processor device. As will be appreciated by persons skilled in the relevant art, processor device 1504 may also be a single processor in a multi-core/multiprocessor system, such system operating alone, or in a cluster of computing devices operating in a cluster or server farm. Processor device 1504 is connected to a communication infrastructure 1506, for example, a bus, message queue, network, or multi-core message-passing scheme.

Computer system 1500 also includes a main memory 1508, for example, random access memory (RAM), and may also include a secondary memory 1510. Secondary memory 1510 may include, for example, a hard disk drive 1512, or removable storage drive 1514. Removable storage drive 1514 may include a floppy disk drive, a magnetic tape drive, an optical disk drive, a flash memory, or the like. The removable storage drive 1514 reads from and/or writes to a removable storage unit 1518 in a well-known manner. Removable storage unit 1518 may include a floppy disk, magnetic tape, optical disk, a universal serial bus (USB) drive, etc. which is read by and written to by removable storage drive 1514. As will be appreciated by persons skilled in the relevant art, removable storage unit 1518 includes a computer usable storage medium having stored therein computer software and/or data.

Computer system 1500 (optionally) includes a display interface 1502 (which can include input and output devices such as keyboards, mice, etc.) that forwards graphics, text, and other data from communication infrastructure 1506 (or from a frame buffer not shown) for display on display unit 1530.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communication interface 1524. Communication interface 1524 allows software and data to be transferred between computer system 1500 and external devices. Communication interface 1524 may include a modem, a network interface (such as an Ethernet card), a communication port, a PCMCIA slot and card, or the like. Software and data transferred via communication interface 1524 may be in the form of signals, which may be electronic, electromagnetic, optical, or other signals capable of being received by communication interface 1524. These signals may be provided to communication interface 1524 via a communication path 1526. Communication path 1526 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1518, removable storage unit 1522, and a hard disk installed in hard disk drive 1512. Computer program medium and computer usable medium may also refer to memories, such as main memory 1508 and secondary memory 1510, which may be memory semiconductors (e.g. DRAMs, etc.).

Computer programs (also called computer control logic) are stored in main memory 1508 and/or secondary memory 1510. Computer programs may also be received via communication interface 1524. Such computer programs, when executed, enable computer system 1500 to implement the embodiments as discussed herein. In particular, the computer programs, when executed, enable processor device 1504 to implement the processes of the embodiments discussed here. Accordingly, such computer programs represent controllers of the computer system 1500. Where the embodiments are implemented using software, the software may be stored in a computer program product and loaded into computer system 1500 using removable storage drive 1514, interface 1520, and hard disk drive 1512, or communication interface 1524.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A pedal-operated vending machine, comprising:
a housing defining a product storage area comprising a plurality of shelves and a delivery portal;
a plurality of dispensing mechanisms configured to convey a product from the product storage area to the delivery portal, wherein each of the plurality of shelves comprises a dispensing mechanism of the plurality of dispensing mechanisms;
a door movably covering the delivery portal, wherein the door is movable from a closed position to an open position;
a pedal arranged on a lower end of the housing below the delivery portal; and
a control unit in communication with the door, the plurality of dispensing mechanisms, and the pedal, wherein the control unit is configured to actuate a dispensing mechanism of the plurality of dispensing mechanisms in response to a first operation of the pedal and wherein the control unit is configured to cause the door to move to the open position in response to a second operation of the pedal.

2. The vending machine of claim 1, further comprising a second pedal configured to be operated by a foot of a consumer to actuate a second dispensing mechanism of the plurality of dispensing mechanisms to move a second product from the product storage area to the delivery portal.

3. The vending machine of claim 1, further comprising a payment processing unit configured to receive a payment from a consumer.

4. The vending machine of claim 3, wherein the control unit is in communication with the payment processing unit and the pedal, such that the control unit enables actuation of the pedal when a payment is received by the payment processing unit.

5. The vending machine of claim 1, wherein the vending machine is configured to dispense a product without a hand of a consumer contacting the vending machine.

6. The vending machine of claim 1, wherein the pedal is arranged within a recessed area on the lower end of the housing.

7. The vending machine of claim 1, wherein the door is connected to the housing by a hinge.

8. The vending machine of claim 1, wherein the door comprises a curvature, and wherein the door rotates about a vertical axis to move from the closed position to the open position.

9. The vending machine of claim 1, further comprising a motor configured to move the door from the closed position to the open position.

10. The vending machine of claim 1, wherein the dispensing mechanism comprises a cup for retrieving a product, wherein the cup is movable via an X-Y mechanism.

11. The vending machine of claim 1, wherein the delivery portal is configured to receive the product from the product storage area so that the product is accessible by a consumer.

12. The vending machine of claim 1, further comprising a payment processing unit configured to receive a contactless payment from a consumer, wherein the pedal is nonoperable until the contactless payment is received.

13. The vending machine of claim 1, further comprising a consumer sensor configured to detect an identity of a consumer, wherein the vending machine is configured to charge an account associated with the consumer for a dispensed product based on the detected identity.

14. The vending machine of claim 13, wherein the consumer sensor is configured to detect the identity of the consumer via biometric recognition.

* * * * *